(12) United States Patent
Zhu et al.

(10) Patent No.: US 10,761,401 B1
(45) Date of Patent: Sep. 1, 2020

(54) METHOD AND APPARATUS FOR PROCESSING RADIO FREQUENCY INPUT SIGNALS AND PROVIDING INTERFERING RADIO FREQUENCY OUTPUT SIGNALS

(71) Applicant: Nanjing University of Aeronautics and Astronautics, Nanjing, Jiangsu (CN)

(72) Inventors: Dan Zhu, Jiangsu (CN); Wenjuan Chen, Jiangsu (CN); Shilong Pan, Jiangsu (CN); Chenxu Xie, Jiangsu (CN); Jiang Liu, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 16/668,308

(22) Filed: Oct. 30, 2019

(51) Int. Cl.
   *G02F 1/35* (2006.01)
   *G02F 1/01* (2006.01)

(52) U.S. Cl.
   CPC ............ *G02F 1/353* (2013.01); *G02F 1/0136* (2013.01); *G02F 2203/56* (2013.01)

(58) Field of Classification Search
   None
   See application file for complete search history.

(56) References Cited

U.S. PATENT DOCUMENTS 9,658,477 B2 * 5/2017 Schaefer ................ H04B 10/90
10,451,806 B1 * 10/2019 Puckett .............. G02B 6/29323

OTHER PUBLICATIONS

Chao He, Shilong Pan, Ronghui Guo, Yongjiu Zhao, and Minghai Pan, "Ultrafast optical frequency comb generated based on cascaded polarization modulators," Optics Letters vol. 37, No. 18, pp. 3834-3836, published on Sep. 15, 2012.

Xinwu Yang, Kun Xu, Jie Yin, Yitang Dai, Feifei Yin, Jianqiang Li, Hua Lu, Tao Liu, and Yuefeng Ji, "Optical frequency comb based multi-band microwave frequency conversion for satellite applications," Opt. Express 22, 869-877 (2014).

Z. Tang, D. Zhu and S. Pan, "Coherent Optical RF Channelizer With Large Instantaneous Bandwidth and Large In-Band Interference Suppression," in Journal of Lightwave Technology, vol. 36, No. 19, pp. 4219-4226, Oct. 1, 2018.

(Continued)

*Primary Examiner* — Rhonda S Peace
(74) *Attorney, Agent, or Firm* — Rui Wu

(57) ABSTRACT

An apparatus includes a signal modulator configured to receive a radio frequency (RF) input signal having frequency bands and spanning a first frequency range within a second frequency range, and provide down-converted signals by converting each frequency band of the RF input signal down to a target frequency range. The apparatus further includes digital RF memories (DRFMs) configured to provide intermediate interfering signals by modulating at least one of the down-converted signals, and an interfering signal generator configured to provide up-converted signals by converting the intermediate interfering signals collectively up to a third frequency range, wherein the third frequency range is within the second frequency range, and provide an interfering RF output signal by combining the up-converted signals, wherein the interfering RF output signal spans the third frequency range.

20 Claims, 20 Drawing Sheets

(56) References Cited

OTHER PUBLICATIONS

Z. Tang and S. Pan, "A Reconfigurable Photonic Microwave Mixer Using a 90° Optical Hybrid," in IEEE Transactions on Microwave Theory and Techniques, vol. 64, No. 9, pp. 3017-3025, Sep. 2016.
Z. Tang and S. Pan, "A reconfigurable photonic microwave mixer," Microwave Photonics (MWP) and the 2014 9th Asia-Pacific Microwave Photonics Conference (APMP) 2014 International Topical Meeting on, Sendai, 2014, pp. 343-345.
Wenjuan Chen, Dan Zhu, Chenxu Xie, Tao Zhou, Xin Zhong, and Shilong Pan, "Photonics-based reconfigurable multi-band linearly frequency-modulated signal generation," Opt. Express 26, 32491-32499 (2018).
D. Zhu, W. Chen, Z. Chen, T. Du, Z. Tang and S. Pan, "RF front-end based on microwave photonics," 2017 Opto-Electronics and Communications Conference (OECC) and Photonics Global Conference (PGC), Singapore, 2017, pp. 1-3.

\* cited by examiner

METHOD AND APPARATUS FOR PROCESSING RADIO FREQUENCY INPUT SIGNALS AND PROVIDING INTERFERING RADIO FREQUENCY OUTPUT SIGNALS

BACKGROUND

1. Technical Field

The present disclosure relates generally to a method and apparatus for processing radio frequency (RF) input signals and providing interfering RF output signals, for example, in a combatting environment.

2. Discussion of Technical Background

In a combatting environment, which normally involves two or more combatting parties, a first party may transmit to a second party an RF input signal, which is expected to be reflected by the second party back to the first party. The first party can determine various types of information related to the second party based on the reflected RF signal received from the second party. For example, the first party can determine a relative distance between the first party and the second party based on a time delay between a first time when the first party transmits the RF input signal to the second party and a second time when the first party receives the reflected RF signal from the second party. For example, the first party can determine a direction of the second party with respect to the first party based on a shift in frequency between the RF input signal transmitted by the first party and the reflected RF signal received by the first party from the second party. For example, the first party can determine at least one making material of the second party based on change in amplitude (or power) between the RF input signal transmitted by the first party and the reflected RF signal received by the first party from the second party. Upon determination of the spatial information of the second party, the first party may take further action, for example, launch a missile, to combat the second party.

SUMMARY

In existing methods, the second party may use a digital RF memory (DRFM) to generate an interfering RF output signal by modulating the RF input signal and transmite the interfering RF output signal to the first party. This is done so that the first party cannot determine accurate information related to the second party based on the interfering RF output signal. For example, the first party can not determine accurately the relative distance between the first party and the second party when the DRFM modulates the RF input signal by introducing one or more fake or unreal time delays. For example, the first party can not determine accurately the relative direction of the second party with respect to the first party when the DRFM performs frequency modulation based on the RF input signal, for example without limitation, by shifting one or more frequencies of the RF input signal. For example, the first party can not determine accurately the at least one making material of the second party when the DRFM performs amplitude modulation based on the RF input signal, for example without limitation, by change amplitude of one or more components included in the RF input signal.

However, the DRFM suffers from a very narrow instantaneous bandwidth which may be limited to only a few hundreds of Mega Hertz (MHz). As a result, this method cannot work properly when the RF input signal has a greater bandwidth than a few hundreds of MHz.

Comparing with RF technologies, optical technologies have the advantages of far greater bandwidths (for example, not limited to tens of Giga Hertz (GHz)), low loss, and immunity to electromagnetic interference. This disclosure discloses methods and apparatuses employing optical technologies in combination with RF technologies that can provide more flexibility and greater instantaneous and working bandwidth than a method and apparatus employing RF technologies alone.

In an exemplary embodiment, there is provided an apparatus comprising: a signal modulator configured to: receive an RF input signal having a plurality of frequency bands and spanning a first frequency range, wherein the first frequency range is within a second frequency range; and provide a plurality of down-converted signals by converting each of the plurality of frequency bands of the RF input signal down to a target frequency range upon receipt of the RF input signal, wherein each frequency in the target frequency range is less than each frequency in the second frequency range; a plurality of DRFMs coupled to the signal modulator, the plurality of DRFMs configured to provide a plurality of intermediate interfering signals by modulating at least one of the plurality of down-converted signals; and an interfering signal generator coupled to the plurality of DRFMs, the interfering signal generator configured to: provide a plurality of up-converted signals by converting the plurality of intermediate interfering signals all within the target frequency range collectively up to a third frequency range, wherein the third frequency range is within the second frequency range; and provide an interfering RF output signal by combining the plurality of up-converted signals, wherein the interfering RF output signal spans the third frequency range.

In an exemplary embodiment, there is provided a method comprising: receiving an RF input signal having a plurality of frequency bands and spanning a first frequency range, wherein the first frequency range is within a second frequency range; providing a plurality of down-converted signals by converting each of the plurality of frequency bands of the RF input signal down to a target frequency range upon receipt of the RF input signal, wherein each frequency in the target frequency range is less than each frequency in the second frequency range; providing a plurality of intermediate interfering signals by modulating at least one of the plurality of down-converted signals; providing a plurality of up-converted signals by converting the plurality of intermediate interfering signals all within the target frequency range collectively up to a third frequency range, wherein the third frequency range is within the second frequency range; and providing an interfering RF output signal by combining the plurality of up-converted signals, wherein the interfering RF output signal spans the third frequency range.

Other concepts relate to software for performing the interfering RF output signal generation as described herein. A software product, in accord with this concept, includes at least one machine-readable non-transitory medium and information carried by the medium.

In an exemplary embodiment, there is provided a machine-readable tangible and non-transitory medium having information, wherein the information, when read by a hardware processor system, causes the hardware processor system to perform following: receiving an RF input signal having a plurality of frequency bands and spanning a first frequency range, wherein the first frequency range is within a second frequency range; providing a plurality of down-converted signals by converting each of the plurality of frequency bands of the RF input signal down to a target frequency range upon receipt of the RF input signal, wherein each frequency in the target frequency range is less than each frequency in the second frequency range; providing a plurality of intermediate interfering signals by modulating at least one of the plurality of down-converted signals; providing a plurality of up-converted signals by converting the plurality of intermediate interfering signals all within the target frequency range collectively up to a third frequency range, wherein the third frequency range is within the second frequency range; and providing an interfering RF output signal by combining the plurality of up-converted signals, wherein the interfering RF output signal spans the third frequency range.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 1:
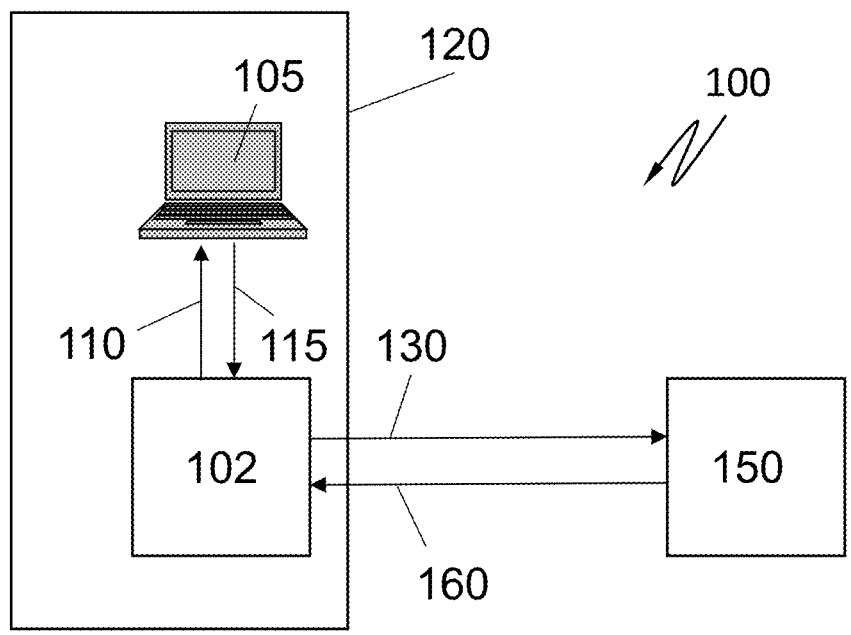
FIG. 1 depicts schematically a combatting system involving a first party and a second party.

Referring to FIG. 1, a combatting system 100 is schematically depicted. As shown, the combatting system 100 includes a first party 120 and a second party 150. In an embodiment, the first party 120 and the second party 150 are opposing to each other. The first party 120 includes a processor 105 and a radar 102. In an embodiment, the processor 105 is a computer system. The second party 150 may be a car, a ship, a plane or any other suitable object, which is either static or moving.

The first party 120 may be configured to determine various types of information related to the second party 150. The various types of information related to the second party 150 includes without limitation the distance between the first party 120 and the second party 150, the direction of the second party 150 with respect to the first party 120, and at least one making material of the second party 150. Upon determination of the various types of information of the second party 150, the first party 120 may be further configured to instruct a third party (not shown) to take action against the second party 150. For example, the first party 120, upon determination of the various types of information of the second party 150, may instruct a missile launcher to launch a missile to target the second party 150 based on the various types of information of the second party 150. For achieving this goal, the radar 102, upon receipt of an instruction 115 from the processor 105, transmits to the second party 150 an RF input signal 130, which is subsequently reflected by the second party 150. The reflected RF signal 160 follows a reverse route of the RF input signal 130 until returning to the radar 102. In an embodiment, the instruction 115 may include the waveform profile of the RF input signal 130 and/or a spectrum of the RF input signal 130. Upon receipt of the reflected RF signal 160, the radar 102 transmits the waveform profile and/or spectral profile 110 of the reflected RF signal 160 to the processor 105, which subsequently determines the various types of information of the second party 150 based on the RF input signal 130 and the reflected RF signal 160. In an embodiment, the processor 105 may determine a time delay between a first time when the first party 120 transmits the RF input signal 130 to the second party 150 and a second time when the first party 120 receives the reflected RF signal 160 from the second party 150 by calculating a cross correlation between the waveform of the RF input signal 130 transmitted by the first party and the waveform of the reflected RF signal 160 received by the first party 120. The processor 105 may further determine the distance between the first party 120 and the second party 150 by multiplying half a speed of light and the determined time delay. In addition or alternatively, the processor 105 may determine a frequency shift between the RF input signal 130 transmitted by the first party 120 to the second party 150 and the reflected RF signal 160 received by the first 120 from the second party 150. The processor 105 may further determine a direction of the second party 150 with respect to the first party 120 based on the determined frequency shift. In addition or alternatively, the processor 105 may determine an amplitude change between the RF input signal 130 transmitted by the first party 120 to the second party 150 and the reflected RF signal 160 received by the first 120 from the second party 150. The processor 105 may further determine at least one making material of the second party 150 based on the determined amplitude change.

If the second party 150 can generate and transmit back, upon receipt of the RF input signal 130, to the first party 120 an interfering RF output signal which is different than the reflected RF signal 160, the first party 120 will not be able to determine the various types of information related to the second party 150 accurately upon receipt of the interfering RF output signal.

Figure 2:
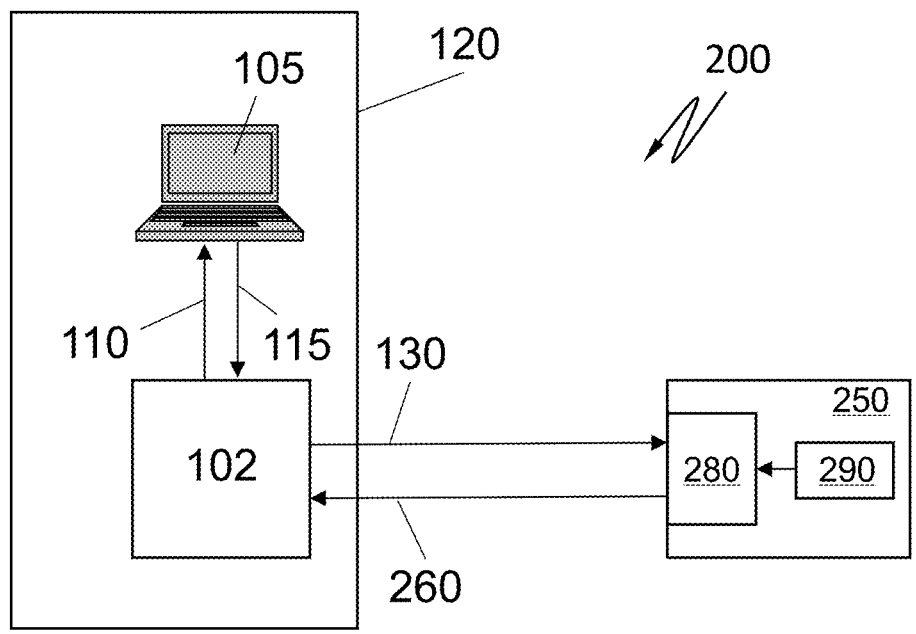
FIG. 2 depicts schematically a combatting system involving a first party and a second party.

Referring to FIG. 2, a combatting system 200 is schematically depicted. As shown, the combatting system 200 includes the first party 120 and a second party 250. Similar to the second party 150, the second party 250 may be a car, a ship, a plane or any other suitable object, which is either static or moving. Different than the second party 150, the second party 250 includes an RF signal processor 280, which is configured to generate an interfering RF output signal 260 based on the RF input signal 130 and transmit the interfering RF output signal 260 to the first party 120. The interfering RF output signal 260 is different than the reflected RF signal 160 so that the processor 105 of the first party 120 cannot determine the accurate information of the second party 250 upon receipt of the interfering RF output signal 260. The RF input signal 130 may include a plurality of frequency bands collectively within a frequency range. In an embodiment, the frequency range corresponds to without limitation, L band, S band, C band, X band, Ku band, K band, Ka band, U band, E band, and/or F band. Specifically, L band is between 1 GHz and 2 GHz. S band is between 2 GHz and 4 GHz. C band is between 4 GHz and 8 GHz. X band is between 8 GHz and 12 GHz. Ku band is between 12 GHz and 18 GHz. K band is between 18 GHz and 27 GHz. Ka band is between 27 GHz and 40 GHz. U band is between 40 GHz and 60 GHz. E band is between 60 GHz and 90 GHz. F band is between 90 GHz and 140 GHz.

In an embodiment, the interfering RF output signal 260 is within the frequency range. In an embodiment, the RF signal processor 280 may generate the interfering RF output signal 260 with each of the plurality of frequency bands having one or more respective fake or unreal time delays. This is done so that the processor 105 of the first party 120 cannot determine the distance between the first party 120 and the second party 250 accurately upon receipt of the interfering RF output signal 260. Alternatively or in addition, the RF signal processor 280 may generate the interfering RF output signal 260 with each of the plurality of frequency bands having one or more respective fake frequency shifts. This is done so that the processor 105 of the first party 120 cannot determine the direction of the second party 250 with respect to the first party 120 accurately upon receipt of the interfering RF output signal 260. Alternatively or inn addition, the RF signal processor 280 may generate the interfering RF output signal 260 with each of the plurality of frequency bands having one or more respective fake amplitude changes. This is done so that the processor 105 of the first party 120 cannot determine at least one making material of the second party 250 accurately upon receipt of the interfering RF output signal 260.

Further, the second party 250 also includes a user interface 290 coupled to the RF signal processor 280. The user interface 290 may be used to reconfigure the RF signal processor 280 as described in further details below.

Figure 3:
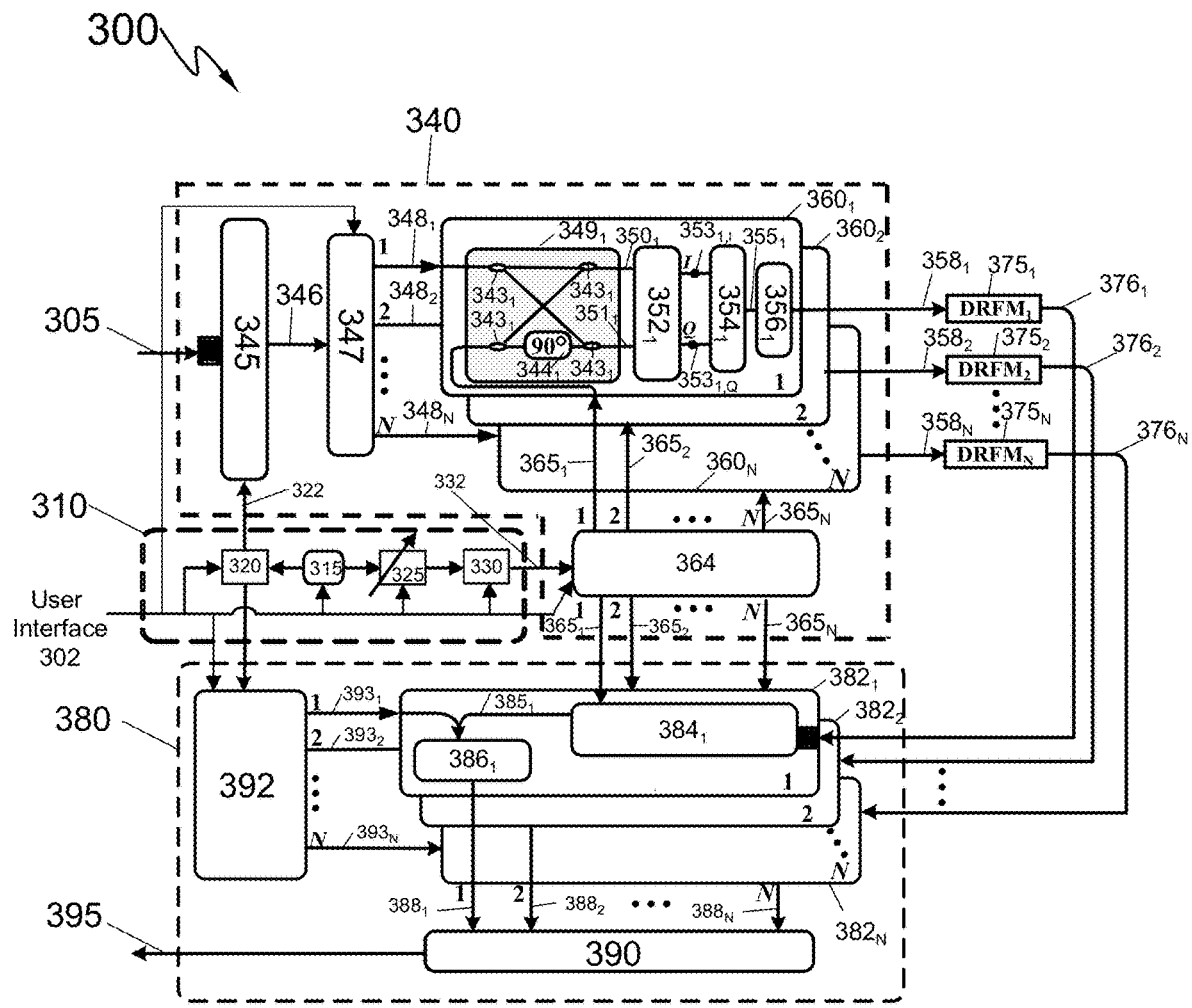
FIG. 3 is a schematic diagram of an RF signal processor according to an embodiment of the disclosure.

Referring to FIG. 3, a schematic diagram of an RF signal processor 300 is depicted according to an embodiment of the disclosure. In an embodiment, the RF signal processor 300 is the RF signal processor 280. As shown, the RF signal processor 300 receives an RF input signal 305 and outputs an interfering RF output signal 395. In an embodiment, the RF input signal 305 is the RF input signal 130, and the interfering RF output signal 395 is the interfering RF output signal 260 in FIG. 2.

As shown, the RF signal processor 300 includes a dual-comb generator 310, a signal modulator 340, a plurality of DRFMs $375_{1-N}$, and an interfering signal generator 380, where N is a positive integer.

The dual-comb generator 310 is coupled to the signal modulator 340 and the interfering signal generator 380. The dual-comb generator 310 is configured to provide a first optical frequency comb 322 and a second optical frequency comb 332. The first optical frequency comb 322 and the second optical frequency comb 332 are coherent, which means a phase difference between the first optical frequency comb 322 and the second optical frequency comb 332 is stable in time. Each of the first optical frequency comb 322 and the second optical frequency comb 332 includes a plurality of equally spaced optical frequency carriers. Sometimes, an optical frequency carrier is also referred to as a frequency carrier, a comb line, a frequency comb line, or an optical frequency comb line. In an embodiment, the first optical frequency comb 322 and the second optical frequency comb 332 are generated from a same continuous wave laser diode, which is configured to provide an electromagnetic radiation having a single nominal carrier frequency or a narrow bandwidth around a nominal carrier frequency. The nominal carrier frequency of an optical frequency carrier is a frequency corresponding to a peak power of the optical frequency carrier. In an embodiment, a spacing between adjacent optical frequency carriers of the first optical frequency comb 322 is different than a spacing between adjacent optical frequency carriers of the second optical frequency comb 332. In an embodiment, a center frequency of the first optical frequency comb 322 is different than a center frequency of the second optical frequency comb 332. As shown, the dual-comb generator 310 is coupled to a user interface 302 which is similar to the user interface 290 as shown in FIG. 2. The user interface 302 may be configured to reconfigure one or more parameters of the first optical frequency comb 322 and/or the second optical frequency comb 332. Different embodiments of configurations of the dual-comb generator 310 will be discussed in great details with respect to FIGS. 4, 5, 6A and 6B.

As shown in FIG. 3, the dual-comb generator 310 provides the first optical frequency comb 322 to the signal modulator 340 and the interfering signal generator 380, and further provides the second optical frequency comb 332 to the signal modulator 340.

The signal modulator 340 is coupled to the dual-comb generator 310, the plurality of DRFMs $375_{1-N}$, and the interfering signal generator 380. The signal modulator 340 is configured to receive the RF input signal 305. The RF input signal 305 may include a plurality of frequency bands corresponding to a plurality of frequency ranges. Each of the plurality of frequency bands spans a respective frequency range of the plurality of frequency ranges. In an embodiment, the plurality of frequency bands spans continuous frequency ranges. In an embodiment, the plurality of frequency bands spans discrete frequency ranges. In an non-limiting example, the RF input signal 305 is within one or more selected from a group consisting of L band, S band, C band, X band, Ku band, K band, Ka band, U band, E band, and F band.

The signal modulator 340 is further configured to provide a plurality of down-converted signals $358_{1-N}$ to the plurality of DRFMs $375_{1-N}$ by converting each of the plurality of frequency bands of the RF input signal 305 to a same target frequency range based on the first optical frequency comb 322 and the second optical frequency comb 332 upon receipt of the RF input signal 305. The signal modulator 340 is further configured to provide each optical frequency carrier of the second optical frequency comb 332 separately to the interfering signal generator 380.

As shown in FIG. 3, the signal modulator 340 includes a suppressed-carrier single sideband (SC-SSB) modulator 345, a first demultiplexer 347, a second demultiplexer 364, and a plurality of down-converters $360_{1-N}$. The SC-SSB modulator 345 is configured to perform an SC-SSB modulation upon receipt of the RF input signal 305 and the first optical frequency comb 322. The SC-SSB modulation allows the SC-SSB modulator 345 to provide a modulated signal 346 by modulating the RF input signal 305 on a first side of each optical frequency carrier of the first optical frequency comb 322 with all optical frequency carriers of the first optical frequency comb 322 suppressed. In an embodiment, the first side is the left side. Accordingly, the SC-SSB modulation allows the SC-SSB modulator 345 to provide the modulated signal 346 by modulating the RF input signal 305 on the left side of each optical frequency carrier of the first optical frequency comb 322 with all optical frequency carriers of the first optical frequency comb 322 suppressed. Alternatively, the first side is the right side. Accordingly, the SC-SSB modulation allows the SC-SSB modulator 345 to provide the modulated signal 346 by modulating the RF input signal 305 on the right side of each optical frequency carrier of the first optical frequency comb 322 with all optical frequency carriers of the first optical frequency comb 322 suppressed.

The first demultiplexer 347 is coupled to the SC-SSB modulator 345 and the user interface 302. The first demultiplexer 347 is configured to split the modulated signal 346 to a plurality of channelized modulated signals $348_{1-N}$ according to a respective frequency range of each output channel of the first demultiplexer 347. In an embodiment, the number of output channels of the first demultiplexer 347 and respective frequency ranges of the output channels of the first demultiplexer 347 can be reconfigurable upon request from the user interface 302. The first demultiplexer 347 is further configured to output the plurality of channelized modulated signals $348_{1-N}$ to the plurality of down-converters $360_{1-N}$. In an embodiment, the first demultiplexer 347 may be a pulse shaper, a programmable optical processor, a programmer optical filter, a micro-ring based optical tunable filter bank, or a liquid crystal modulator based optical tunable filter bank.

The second demultiplexer 364 is coupled to the dual-comb generator 310, the user interface 302, the plurality of down-converters $360_{1-N}$, and the interfering signal generator 380. The second demultiplexer 364 is configured to split the second optical frequency comb 332 to a plurality of optical frequency carriers and provide each optical frequency carrier $365_{1-N}$ of the second optical frequency comb 332 to a respective one of the plurality of down-converters $360_{1-N}$. The second demultiplexer 364 is further configured to provide each optical frequency carrier $365_{1-N}$ of the second optical frequency comb 332 to the interfering signal generator 380. As discussed above, the first optical frequency comb 322 and the second optical frequency combs 332 may be reconfigurable upon request from the user interface 302. This means the center frequency of the first optical frequency comb 322, the center frequency of the second optical frequency comb 332, the spacing between adjacent frequency carriers of the first optical frequency comb 322, the spacing between adjacent frequency carriers of the second optical frequency comb 332, a number of optical frequency carriers of the first optical frequency comb 322, and/or a number of optical frequency carriers of the second optical frequency comb 332 may be reconfigurable. Accordingly, a number of output channels of the second demultiplexer 364 and respective frequency ranges of the output channels of the second demultiplexer 364 may be reconfigurable upon request from the user interface 302. In an embodiment, the second demultiplexer 364 may be a pulse shaper, a programmable optical processor, a programmer optical filter, a micro-ring based optical tunable filter bank, or a liquid crystal modulator based optical tunable filter bank.

The plurality of down-converters $360_{1-N}$ is coupled to the first demultiplexer 347, the second demultiplexer 364, and the plurality of DRFMs $375_{1-N}$. Each of the plurality of down-converters $360_{1-N}$ is configured to receive a respective one of the plurality of channelized modulated signals $348_{1-N}$ and a respective one of the plurality of optical frequency carriers $365_{1-N}$ of the second optical frequency comb 332. Each of the plurality of down-converters $360_{1-N}$, denoted by a down-converter $360_i$ for simplicity of explanation where $1 \leq i \leq N$ is further configured to provide a respective one of the plurality of down-converted signals $358_{1-N}$ all within the target frequency range, denoted by a down-converted signal $358_i$, based on the respective one of the plurality of channelized modulated signals $348_{1-N}$, denoted by a channelized modulated signal $348_i$, and the respective one of the plurality of optical frequency carriers $365_{1-N}$ of the second optical frequency comb 332, denoted by an optical frequency carrier $365_i$ of the second optical frequency comb 332. The down-converter $360_i$ includes an optical 90° hybrid $349_i$, a photodetector $352_i$, an electrical 90° hybrid $354_i$, and a bandpass filter $356_i$.

The optical 90° hybrid $349_i$ includes three 1×2 couplers $343_i$ and an optical 90° phase shifter $344_i$. The optical 90° hybrid $349_i$ is configured to receive the channelized modulated signal $348_i$ and the optical frequency carrier $365_i$ of the second optical frequency comb 332. The optical 90° hybrid $349_i$ is further configured to provide a first combined optical signal $350_i$ and a second combined optical signal $351_i$. The first combined optical signal $350_i$ is the combination of the channelized modulated signal $348_i$ and the optical frequency carrier $365_i$ of the second optical frequency comb 332. The second combined optical signal $351_i$ is the combination of the optical frequency carrier $365_i$ of the second optical frequency comb 332 with 90° phase shift and the channelized modulated signal $348_i$.

The photodetector $352_i$ is coupled to the optical 90° hybrid $349_i$ and the electrical 90° hybrid $354_i$. The photodetector $352_i$ is configured to convert the first combined optical signal $350_i$ to an in-phase electrical current $353_{i,I}$ and convert the second combined optical signal $351_i$ to a quadrature-phase electrical current $353_{i,Q}$. The photodetector $352_i$ is further configured to provide the in-phase electrical current $353_{i,I}$ and the quadrature-phase electrical current $353_{i,Q}$ to the electrical 90° hybrid $354_i$.

The electrical 90° hybrid $354_i$ is configured to receive the in-phase electrical current $353_{i,I}$ and the quadrature-phase electrical current $353_{i,Q}$. The electrical 90° hybrid 354 is further configured to provide an intermediate RF signal $355_i$ by combining the quadrature-phase electrical current $353_{i,Q}$ with 90° phase shift and the in-phase electrical current $353_{i,I}$. In an embodiment, the intermediate RF signal 355 is at least a portion of the channelized modulated signal $348_i$ which is on one side of the optical frequency carrier $365_i$ in the frequency domain with the remaining portion of the channelized modulated signal $348_i$ which is on the other side of the optical frequency carrier $365_i$ in the frequency domain significantly suppressed. In an embodiment, the intermediate RF signal $355_i$ is at least a portion of the channelized modulated signal $348_i$ which is on the right side of the optical frequency carrier $365_i$ in the frequency domain with the remaining portion of the channelized modulated signal $348_i$ which is on the left side of the optical frequency carrier $365_i$ in the frequency domain significantly suppressed. In an embodiment, the intermediate RF signal $355_i$ is at least a portion of the channelized modulated signal $348_i$ which is on the left side of the optical frequency carrier $365_i$ in the frequency domain with the remaining portion of the channelized modulated signal $348_i$ which is on the right side of the optical frequency carrier $365_i$ in the frequency domain significantly suppressed. In an embodiment, the intermediate RF signal $355_i$ is at least a portion of the channelized modulated signal $348_i$ the frequencies of which is no smaller than the nominal carrier frequency of the optical frequency carrier $365_i$ in the frequency domain with the remaining portion of the channelized modulated signal $348_i$ the frequencies of which is smaller than the nominal carrier frequency of the optical frequency carrier $365_i$ in the frequency domain significantly suppressed. In an embodiment, the intermediate RF signal 355 is at least a portion of the channelized modulated signal $348_i$ the frequencies of which is no greater than the nominal carrier frequency of the optical frequency carrier $365_1$ in the frequency domain with the remaining portion of the channelized modulated signal $348_i$ the frequencies of which is greater than the nominal carrier frequency of the optical frequency carrier $365_i$ in the frequency domain significantly suppressed.

The bandpass filter $356_i$ is coupled to the electrical 90° hybrid $354_i$ and a respective one of the plurality of DRFMs $375_{1-N}$, denoted by a DRFM $375_i$. The bandpass filter $356_i$ is configured to receive the intermediate RF signal $355_i$ and output at least a portion of the intermediate RF signal $355_i$ which falls within the working bandwidth of the bandpass filter $356_i$ as the down-converted signal $358_i$. In an embodiment, the working bandwidths of the bandpass filters $356_{1-N}$ are the same. As a result, the down-converted signals $358_{1-N}$ have the same target frequency range limited by the working bandwidths of the bandpass filters $356_{1-N}$.

The plurality of DRFMs $375_{1-N}$ is coupled to the signal generator 340 and the interfering signal generator 380. Specifically, the plurality of DRFMs $375_{1-N}$ is coupled to the plurality of down-converters $360_{1-N}$ and configured to receive the down-converted signals $358_{1-N}$. The plurality of DRFMs $375_{1-N}$ is further configured to provide a plurality of intermediate interfering signals $376_{1-N}$ to the interfering signal generator 380 by modulating the plurality of down-converted signals $358_{1-N}$. In an embodiment, the plurality of DRFMs $375_{1-N}$ modulates at least one of the plurality of down-converted signals $358_{1-N}$ by introducing one or more fake or unreal time delays to the at least one of the plurality of down-converted signals $358_{1-N}$. In an embodiment, the plurality of DRFMs $375_{1-N}$ modulates the plurality of down-converted signals $358_{1-N}$ by introducing one or more fake or unreal time delays to each of the plurality of down-converted signals $358_{1-N}$. Alternatively or in addition, the plurality of DRFMs $375_{1-N}$ modulates at least one of the plurality of down-converted signals $358_{1-N}$ by performing frequency modulation on the at least one of the plurality of down-converted signals $358_{1-N}$ so as to provide one or more respective frequency shifts with respect to at least one of the plurality of down-converted signals $358_{1-N}$. Alternatively or in addition, the plurality of DRFMs $375_{1-N}$ modulates the plurality of down-converted signals $358_{1-N}$ by performing frequency modulation on each of the plurality of down-converted signals $358_{1-N}$ so as to provide one or more respective frequency shifts with respect to each of the plurality of down-converted signals $358_{1-N}$. Alternatively or in addition, the plurality of DRFMs $375_{1-N}$ modulates at least one of the plurality of down-converted signals $358_{1-N}$ by performing amplitude modulation on the at least one of the plurality of down-converted signals $358_{1-N}$ so as to provide one or more respective amplitude changes with respect to at least one of the plurality of down-converted signals $358_{1-N}$. Alternatively or in addition, the plurality of DRFMs $375_{1-N}$ modulates the plurality of down-converted signals $358_{1-N}$ by performing amplitude modulation on each of the plurality of down-converted signals $358_{1-N}$ so as to provide one or more respective amplitude changes with respect to each of the plurality of down-converted signals $358_{1-N}$.

More details of the plurality of DRFMs $375_{1-N}$ will be discussed below with respect to FIG. 6C. In an embodiment, the plurality of intermediate interfering signals $376_{1-N}$ has the same target frequency ranges as the plurality of down-converted signals $358_{1-N}$.

The interfering signal generator 380 is coupled to the dual-comb generator 310, the signal modulator 340, the plurality of DRFMs $375_{1-N}$, and the user interface 302. The interfering signal generator 380 is configured to receive the plurality of intermediate interfering signals $376_{1-N}$ from the plurality of DRFMs $375_{1-N}$ and the plurality of optical frequency carriers of the second optical frequency comb 332 from the second demultiplexer 364. The interfering signal generator 380 is configured to further receive the first optical frequency comb 322. The interfering signal generator 380 is further configured to provide a plurality of up-converted signals $388_{1-N}$ by converting the plurality of intermediate interfering signals $376_{1-N}$ up to the plurality of frequency ranges spanned by the plurality of frequency bands of the RF input signal 305 based on the first optical frequency comb 322 and the second optical frequency comb 332. In addition, the interfering signal generator 380 is further configured to provide the interfering RF output signal 395, and transmit the interfering RF output signal 395, for example, to the radar 102 in FIG. 2, by combining the plurality of up-converted signals $388_{1-N}$.

In an embodiment, when a frequency range spanned by each of the plurality of intermediate interfering signals $376_{1-N}$ is the same target frequency range spanned by each of the plurality of down-converted signals $358_{1-N}$, a collective frequency range spanned by the interfering RF output signal 395 is the same as a collective frequency range spanned by the RF input signal 305. In an embodiment, the frequency range spanned by each of the plurality of intermediate interfering signals $376_{1-N}$ is the same target frequency range when the plurality of down-converted signals $358_{1-N}$ is modulated by the plurality of DRFMs $375_{1-N}$ by introducing one or more fake or unreal time delays or by performing amplitude modulation with respect to one or more of the plurality of down-converted signals $358_{1-N}$ as described above.

In an embodiment, when a frequency range spanned by at least one of the plurality of intermediate interfering signals $376_{1-N}$ is not the same target frequency range spanned by each of the plurality of down-converted signals $358_{1-N}$, the collective frequency range spanned by the interfering RF output signal 395 is different than a collective frequency range spanned by the RF input signal 305. In an embodiment, the frequency range spanned by at least one of the plurality of intermediate interfering signals $376_{1-N}$ is not the same target frequency range when the plurality of down-converted signals $358_{1-N}$ is modulated by the plurality of DRFMs $375_{1-N}$ by performing frequency modulation with respect to one or more of the plurality of down-converted signals $358_{1-N}$, as an non-limiting example, by shifting one or more frequencies of the one or more of the plurality of down-converted signals $358_{1-N}$ in a same direction or different directions.

As shown in FIG. 3, the interfering signal generator 380 includes a demultiplexer 392, a plurality of up-converters $382_{1-N}$, and an RF combiner 390.

The demultiplexer 392 is coupled to the dual-comb generator 310 and the user interface 302. The demultiplexer 392 is configured to receive an optical frequency comb from the dual-comb generator 310, split the optical frequency comb to a plurality of optical frequency carriers $393_{1-N}$ individually, and provide each optical frequency carrier $393_{1-N}$ to a respective one of the plurality of up-converters $382_{1-N}$. In this example, the optical frequency comb is the first optical frequency comb 322. As discussed above, the first optical frequency comb 322 and the second optical frequency combs 332 may be reconfigurable upon request from the user interface 302. This means the center frequency of the first optical frequency comb 322, the center frequency of the second optical frequency comb 332, the spacing between adjacent frequency carriers of the first optical frequency comb 322, the spacing between adjacent frequency carriers of the second optical frequency comb 332, a number of optical frequency carriers of the first optical frequency comb 322, and/or a number of optical frequency carriers of the second optical frequency comb 332 may be reconfigurable. Accordingly, a number of output channels of the demultiplexer 392 and respective frequency ranges of the output channels of the demultiplexer 392 may be reconfigurable upon request from the user interface 302. In an embodiment, the demultiplexer 392 may be a pulse shaper, a programmable optical processor, a programmer optical filter, a micro-ring based optical tunable filter bank, or a liquid crystal modulator based optical tunable filter bank.

The plurality of up-converters $382_{1-N}$ is coupled to the demultiplexer 392, the second demultiplexer 364, and the plurality of DRFMs $375_{1-N}$. Each of the plurality of up-converters $382_{1-N}$ is configured to receive a respective one of the plurality of intermediate interfering signals $376_{1-N}$, a respective one of the plurality of optical frequency carriers $393_{1-N}$ of the first optical frequency comb 322, and a respective one of the plurality of optical frequency carriers $365_{1-N}$ of the second optical frequency comb 332. Each of the plurality of up-converters $382_{1-N}$, denoted by an up-converter $382_i$ for simplicity of explanation where $1 \leq i \leq N$ is further configured to provide a respective one of the plurality of up-converted signals $388_{1-N}$, denoted by an up-converted signal $388_i$, based on the respective one of the plurality of intermediate interfering signals modulated signals $376_{1-N}$, denoted by an intermediate interfering signal $376_i$, the respective one of the plurality of optical frequency carriers $393_{1-N}$ of the first optical frequency comb 322, denoted by an optical frequency carrier $393_i$ of the first optical frequency comb 322, and the respective one of the plurality of optical frequency carriers $365_{1-N}$ of the second optical frequency comb 332, denoted by an optical frequency carrier $365_i$ of the second optical frequency comb 332.

The up-converter $382_i$ includes an SC-SSB modulator $384_i$ and a photodetector $386_i$. The SC-SSB modulator $384_i$ is configured to perform an SC-SSB modulation upon receipt of the optical frequency carrier $365_i$ and the intermediate interfering signal $376_i$. The SC-SSB modulation allows the SC-SSB modulator $384_i$ to provide a modulated signal $385_i$ by modulating the intermediate interfering signal $376_i$ on a second side of the optical frequency carrier $365_i$ with the optical frequency carriers $365_i$ suppressed. The second side is the same as the first side which was described above with regard to the SC-SSB modulator 345. This means, when the SC-SSB modulator 345 provides the modulated signal 346 by modulating the RF input signal 305 on the left side of each optical frequency carrier of the first optical frequency comb 322 with all optical frequency carriers of the first optical frequency comb 322 suppressed, the SC-SSB modulator 384$_i$ provides the modulated signal 385$_i$ by modulating the intermediate interfering signal 3'76 on the left side of the optical frequency carrier 365$_i$ with the optical frequency carriers 365$_i$ suppressed. Alternatively, when the SC-SSB modulator 345 provides the modulated signal 346 by modulating the RF input signal 305 on the right side of each optical frequency carrier of the first optical frequency comb 322 with all optical frequency carriers of the first optical frequency comb 322 suppressed, the SC-SSB modulator 384$_i$ provides the modulated signal 385$_i$ by modulating the intermediate interfering signal 376$_i$ on the right side of the optical frequency carrier 365$_i$ with the optical frequency carriers 365$_i$ suppressed.

The photodetector 386$_i$ is coupled to an output channel of the demultiplexer 392 and configured to receive the optical frequency carrier 393$_i$ of the first optical frequency comb 322. The photodetector 386$_i$ is coupled to the SC-SSB modulator 384$_i$ and is configured to receive the modulated signal 385$_i$. The photodetector 386$_i$ is further coupled to an input channel of the RF combiner 390 and is configured to generate the up-converted signal 388$_i$ by performing a frequency beating of the optical frequency carrier 393$_i$ of the first optical frequency comb 322 and the modulated signal 385$_i$ and provide the up-converted signal 388$_i$ to the RF combiner 390 through the respective input channel of the RF combiner 390.

The RF combiner 390 includes a plurality of input channels each coupled to a respective one of the plurality of up-converters 382$_{1-N}$. The RF combiner 390 further includes an output channel. The RF combiner 390 is configured to provide the interfering RF output signal 395 through the output channel by combining the plurality of up-converted signals 388$_{1-N}$.

Figure 4:
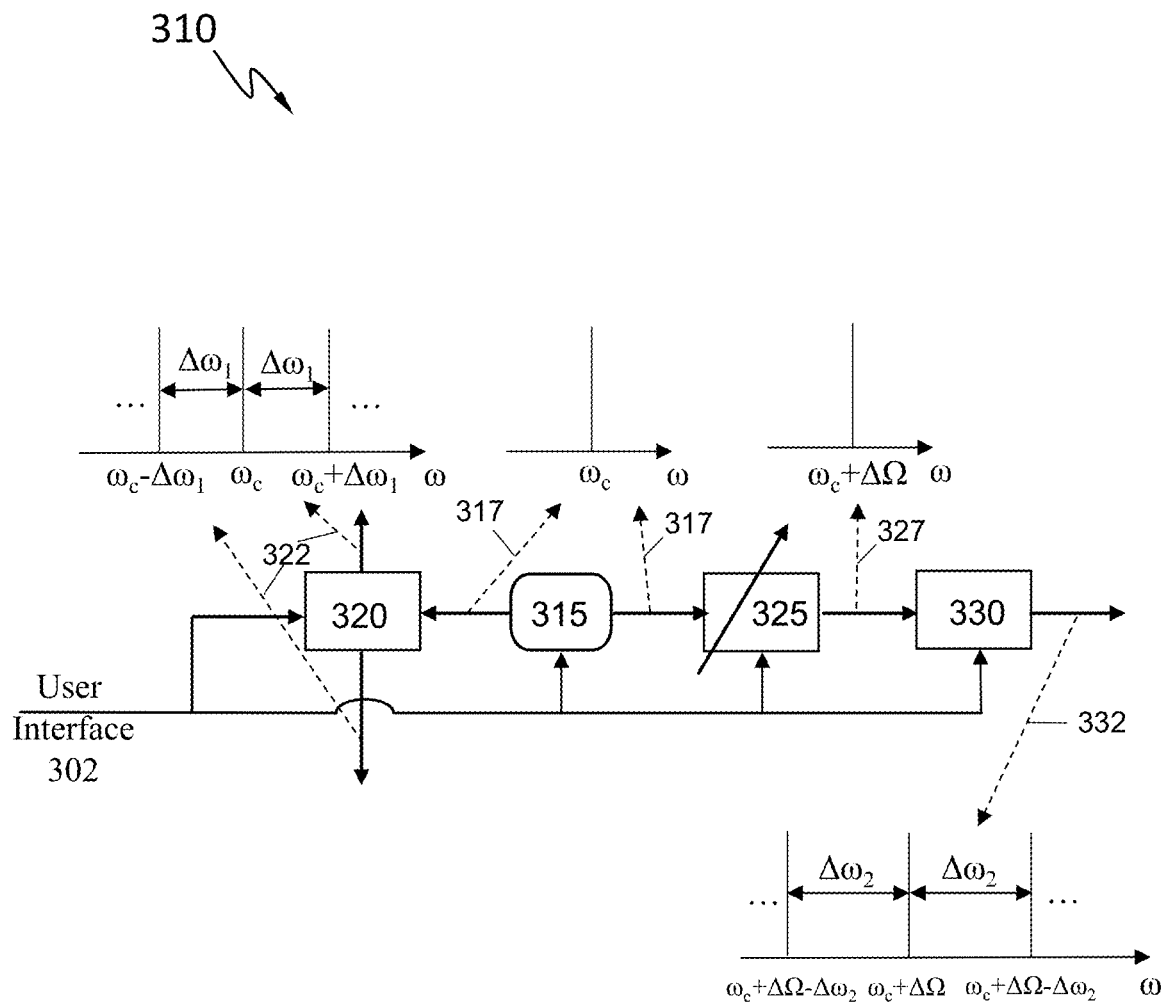
FIG. 4 is a schematic diagram of a dual-comb generator according to an embodiment of the disclosure.

Referring to FIG. 4, a schematic diagram of the dual-comb generator 310 is depicted according to an embodiment of the disclosure. As shown the dual-comb generator 310 includes a laser diode 315, a first comb generator 320, a frequency shifter 325, and a second comb generator 330. In an embodiment, the first comb generator 320 and the second comb generator 330 are configured similarly.

The laser diode 315 is configured to provide a first electromagnetic radiation 317 having a single optical frequency carrier at a nominal carrier frequency of $\omega_c$ (for example, as shown in FIG. 4 and directed by arrow 317) to the first comb generator 320 and the frequency shifter 325. In an embodiment, the laser diode 315 may be a continuous wave laser configured to provide the single optical frequency carrier at the nominal carrier frequency of $\omega_c$ with a narrow bandwidth (or a narrow linewidth). In an embodiment, the nominal carrier frequency of $\omega_c$ may be adjusted upon request through the user interface 302. In an embodiment, the laser diode 315 is a continuous wave laser diode. In an embodiment, the laser diode 315 is a distributed feedback laser.

The first comb generator 320 is configured to provide the first optical frequency comb 322 as shown in FIG. 4 and directed by arrow 322 upon receipt of the first electromagnetic radiation from the laser diode 315. As shown, the first optical frequency comb 322 includes a plurality of equally spaced optical frequency carriers. The first optical frequency comb 322 has a center frequency equal to the nominal carrier frequency of the first electromagnetic radiation 317, $\omega_c$. The spacing between adjacent optical frequency carriers of the first optical frequency comb 322 is denoted by $\Delta\omega_1$. In an embodiment, a number of optical frequency carriers included in the first optical frequency comb 322 is equal to or greater than N, where N is a positive integer. In an embodiment, the spacing $\Delta\omega_1$ may be adjusted upon request through the user interface 302.

The frequency shifter 325 is configured to provide a second electromagnetic 327 radiation having a single optical frequency carrier at a nominal carrier frequency of $\omega_c+\Delta\Omega$ (for example, as shown in FIG. 4 and directed by arrow 327) to the second comb generator 330 based on the first electromagnetic radiation 317 upon receipt of the first electromagnetic radiation 317. $\Delta\Omega$ can be either positive or negative. In an embodiment, the frequency shift $\Delta\Omega$, may be adjusted upon request through the user interface 302.

The second comb generator 330 is configured to provide the second optical frequency comb 332 as shown in FIG. 4 and directed by arrow 332 upon receipt of the second electromagnetic radiation 327 from the frequency shifter 325. As shown, the second optical frequency comb 332 includes a plurality of equally spaced optical frequency carriers. The second optical frequency comb 332 has a center frequency equal to the nominal carrier frequency of the second electromagnetic radiation 327, $\omega_c+\Delta\Omega$. The spacing between adjacent optical frequency carriers of the second optical frequency comb 332 is denoted by $\Delta\omega_2$. In an embodiment, a number of optical frequency carriers included in the second optical frequency comb 332 is equal to or greater than N, where N is a positive integer. In an embodiment, the spacing $\Delta\omega_2$ may be adjusted upon request through the user interface 302. In an embodiment, $\Delta\omega_2$ is not equal to $\Delta\omega_1$.

Figure 5:
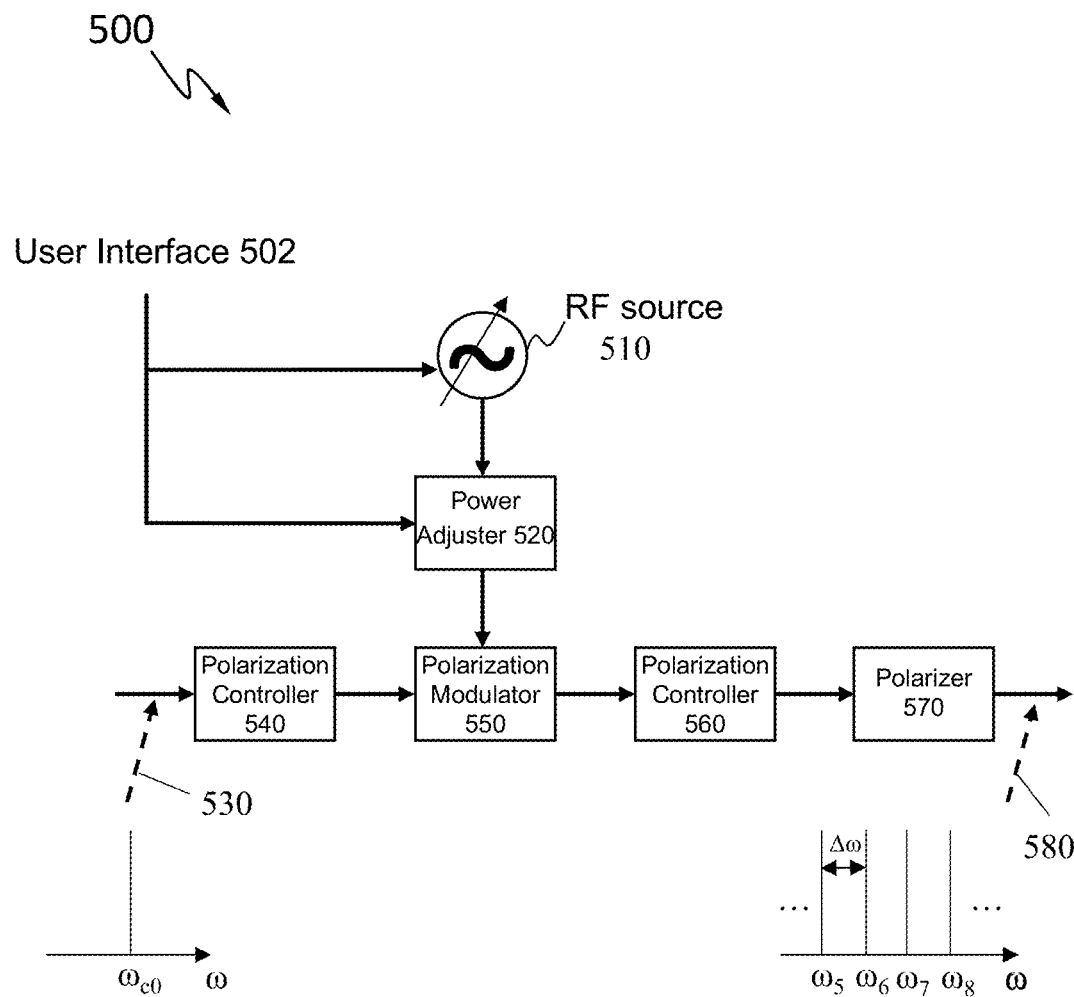
FIG. 5 is a schematic diagram of a comb generator according to an embodiment of the disclosure.

Referring to FIG. 5, a schematic diagram of a comb generator 500 is shown according to an embodiment of the present disclosure. The comb generator 500 may be the first comb generator 320 and/or the second comb generator 330. As shown, the comb generator 500 includes a first polarization controller 540, an RF source 510, a power adjuster 520, a polarization modulator 550, a second polarization controller 560, and a polarizer 570. The first polarization controller 540 may be similar to the second polarization controller 560. As shown, the RF source 510 and the power adjuster 520 are coupled to the user interface 502. In an embodiment, the user interface 502 is the user interface 302.

The first polarization controller 540 is configured to tune the polarization state of an electromagnetic radiation 530 upon receipt of the electromagnetic radiation 530. The first polarization controller 540 may be further configured to output the electromagnetic radiation 530 to the polarization modulator 550 after the polarization state is adjusted. As shown in FIG. 5, the electromagnetic radiation 530 as directed by arrow 530 has a single nominal carrier frequency of $\omega_{c0}$.

The polarization modulator 550 is coupled to the first polarization controller 540 and the power adjuster 520. The polarization modulator 550 is configured to modulate the polarization of the electromagnetic radiation received from the first polarization controller 540 according to the RF signal received from the power adjuster 520. The polarization modulator 550 may be further configured to provide the electromagnetic radiation after polarization modulation to the second polarization controller 560.

The RF source 510 may be configured to provide an RF signal to the power adjuster 520 at a frequency of $\Delta\omega$. In an embodiment, the RF source 510 is coupled to the user interface 502, which may be used to adjust the power and/or the frequency of $\Delta\omega$ of the RF signal provided by the RF source 510.

The power adjuster 520 is coupled to the RF source 510 and configured to adjust the power of the RF signal provided to the polarization modulator 550. In an embodiment, the power adjuster 520 may include a tunable RF amplifier with an adjustable power amplification. In an embodiment, the power adjuster 520 may include a tunable RF attenuator with an adjustable power attenuation. In an embodiment, the amount of power amplification and/or power attenuation may be adjusted by the user interface 502.

The second polarization controller 560 may be coupled to the polarization modulator 550 and configured to adjust the polarization state of the electromagnetic radiation received from the polarization modulator 550. The second polarization controller 560 may be further configured to provide the electromagnetic radiation after the polarization state is adjusted to the polarizer 570.

The polarizer 570 may be configured to receive the electromagnetic radiation from the second polarization controller 560. By carefully adjusted the first polarization controller 540, the power adjuster 520, the polarization modulator 550, and the second polarization controller 560, the polarizer 570 may be further configured to output an optical frequency comb 580 having an equal spacing of $\Delta\omega$ and a flat spectral profile, for example, as shown in FIG. 5 as directed by arrow 580. In some examples, the comb generator 500 may include more than one polarization modulator 550 to provide a larger number of optical frequency carriers. More details about the comb generator 500 may be found in Chao He, et. al, "Ultrafast optical frequency comb generated based on cascaded polarization modulators," Optics Letters Vol. 37, No. 18, pages 3834-3836, published on Sep. 15, 2012, which is incorporated by reference in its entirety.

In an embodiment, the electromagnetic radiation 530 is the first electromagnetic radiation 317 (i.e., $\omega_{c0}=\omega_c$ and $\Delta\omega=\Delta\omega_1$) and the optical frequency comb 580 is the first optical frequency comb 322 when the comb generator 500 is the first comb generator 320. In an embodiment, the electromagnetic radiation 530 is the second electromagnetic radiation 327 (i.e., $\omega_{c0}=\omega_c+\Delta\Omega$ and $\Delta\omega=\Delta\omega_2$) and the optical frequency comb 580 is the second optical frequency comb 332 when the comb generator 500 is the second comb generator 330.

Figure 6A:
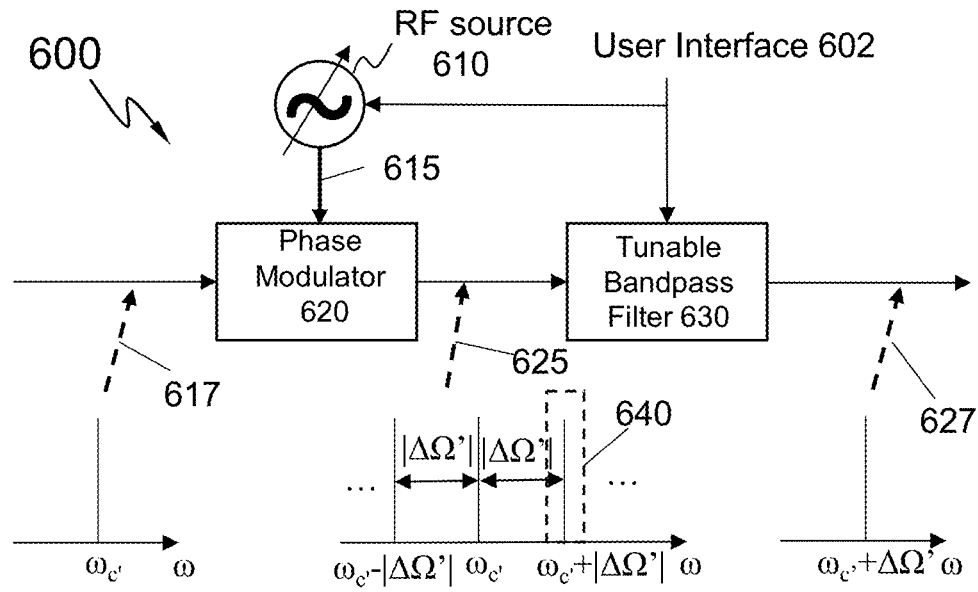
FIG. 6A is a schematic diagram of a frequency shifter according to an embodiment of the disclosure.

Referring to FIG. 6A, a schematic diagram of a frequency shifter 600 is shown according to an embodiment of the present disclosure. In an embodiment, the frequency shifter 600 is the frequency shifter 325. The frequency shifter 600 is configured to receive a first electromagnetic radiation 617 and output the second electromagnetic radiation 627. In an embodiment, the first electromagnetic radiation 617 has a single nominal carrier frequency of $\omega_c$, as shown in FIG. 6A and directed by arrow 617, and the second electromagnetic radiation 627 has a single nominal carrier frequency of $\omega_c+\Delta\Omega'$ as shown in FIG. 6A and directed by arrow 627. In an embodiment, the first electromagnetic radiation 617 is the first electromagnetic radiation 317, and the second electromagnetic radiation 627 is the second electromagnetic radiation 327. In an embodiment, $\omega_{c'}=\omega_c$. In an embodiment, $\Delta\Omega'=\Delta\Omega$. In an embodiment, $\omega_c+\Delta\Omega'=\omega_c+\Delta\Omega$.

The frequency shifter 600 includes an RF source 610, a phase modulator 620, and a tunable bandpass filter 630. As shown, the RF source 610 and the tunable bandpass filter 630 are coupled to a user interface 602. In an embodiment, the user interface 602 is the user interface 302.

The RF source 610 is configured to provide an RF signal 615 to the phase modulator 620 at a frequency of $|\Delta\Omega'|$. In an embodiment, the RF source 610 is coupled to the user interface 502, which may be used to adjust the power and/or the frequency of $|\Delta\Omega'|$ of the RF signal 615 provided by the RF source 610.

The phase modulator 620 is coupled to the RF source 610 and configured to receive the first electromagnetic radiation 617 and the RF signal 615. The phase modulator 620 is further configured to provide an optical spectrum 625 by perform phase modulation of the first electromagnetic radiation 617 based on the RF signal 615. An example of the optical spectrum 625 is shown in FIG. 6A as directed by arrow 625. As shown, the optical spectrum 625 includes a plurality of equally spaced optical frequency carriers. The spacing between adjacent optical frequency carriers of the optical spectrum 625 is equal to $|\Delta\Omega'|$. The optical spectrum 625 includes a center optical frequency carrier having a nominal carrier frequency of $\omega_{c'}$. In an embodiment, the phase modulator 620 may be replaced by an intensity modulator.

The tunable bandpass filter 630 is further configured to select an optical frequency carrier having a nominal carrier frequency other than $\omega_{c'}$ from the optical spectrum 625. The tunable bandpass filter 630 is further configured to output the selected optical frequency carrier 627 as shown in FIG. 6A and directed by arrow 627. An example filtering profile shape 640 of the tunable bandpass filter 630 is shown in FIG. 6A as the dashed box. In an embodiment, the selected optical frequency carrier 627 has a nominal carrier frequency of $\omega_{c'}+\Delta\Omega'$. In an embodiment, $\Delta\Omega'$ is positive. Accordingly, the selected optical frequency carrier may be the one having the nominal carrier frequency of $\omega_{c'}+\Omega\Delta\Omega'$ on the right side of the center optical frequency carrier as shown and included in the dashed box 640 in FIG. 6A. In an embodiment, $\Delta\Omega'$ is negative. Accordingly, the selected optical frequency carrier 627 may be the one having the nominal carrier frequency of $\omega_{c'}-|\Delta\Omega'|$ on the left side of the center optical frequency carrier. In an embodiment, $|\Delta\Omega'|$ may be adjusted by the RF source 610 upon request through the user interface 602. In an embodiment, the working frequency range of the tunable bandpass filter 630 may be adjusted upon request through the user interface 602.

Figure 6C:
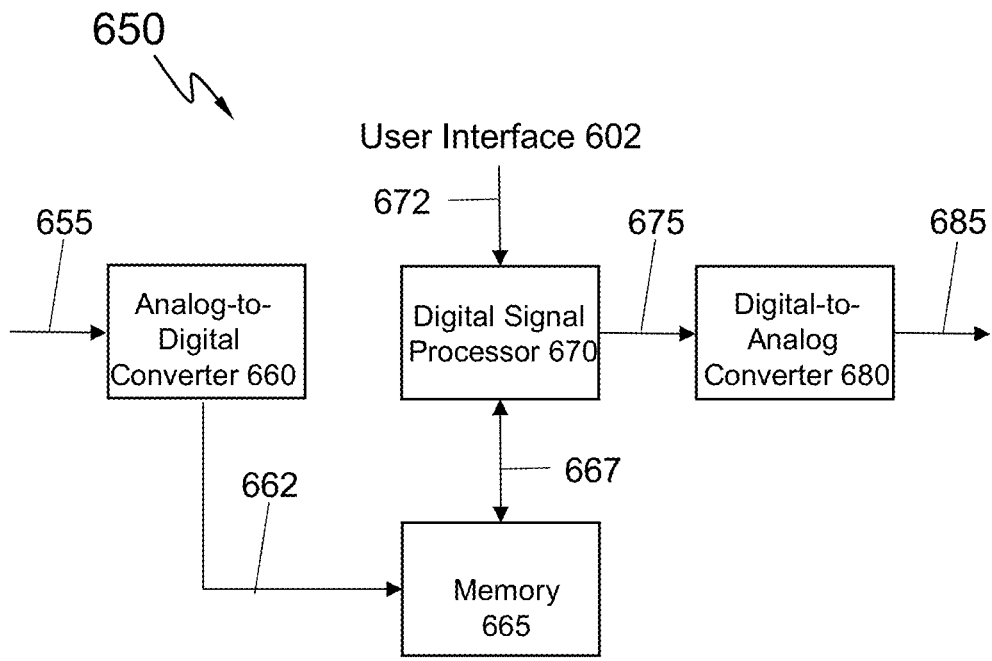
FIG. 6C is a schematic diagram of a DRFM.
Figure 6B:
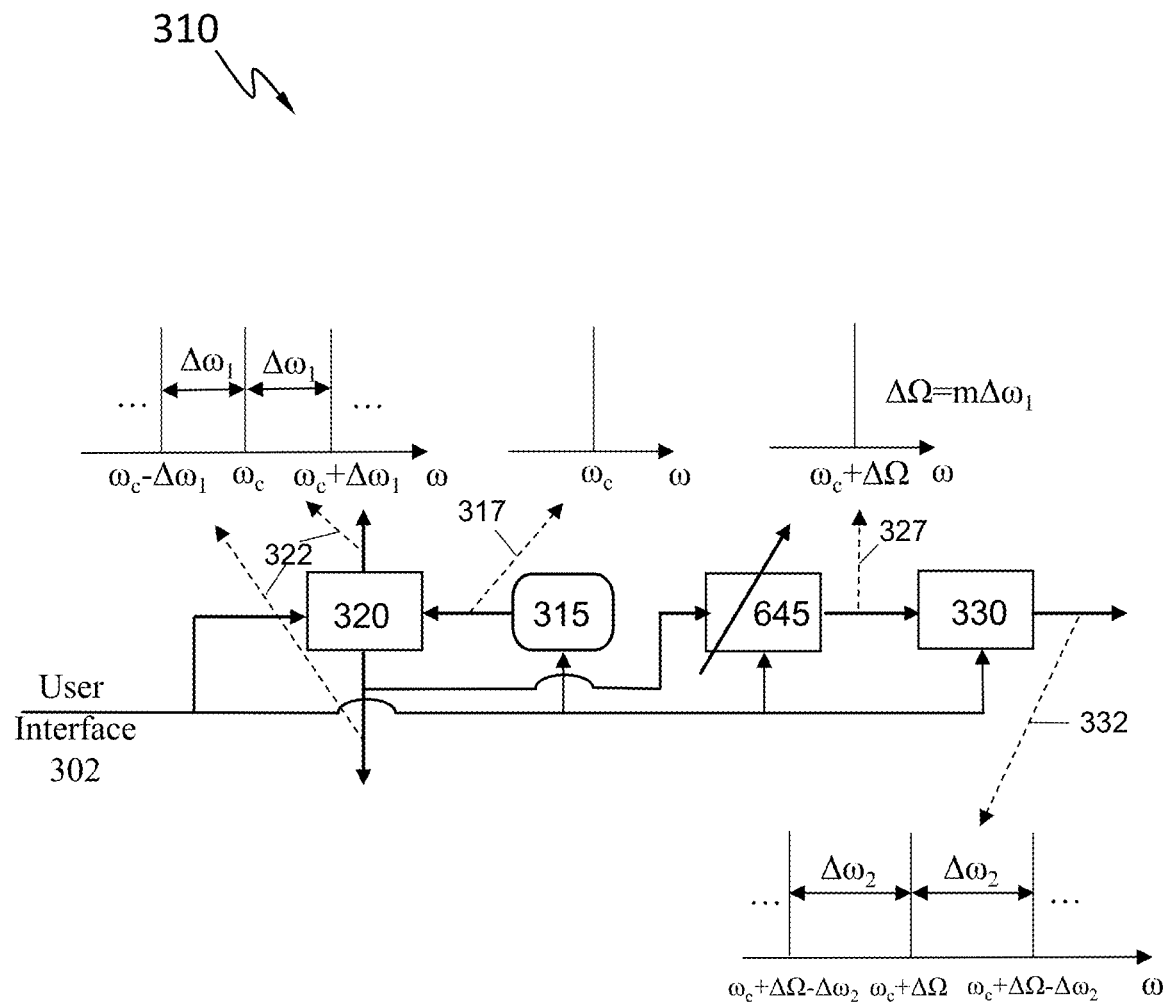
FIG. 6B is a schematic diagram of a dual-comb generator according to an embodiment of the disclosure.

Referring to FIG. 6B, a schematic diagram of the dual-comb generator 310 is depicted according to an embodiment of the disclosure.

As shown the dual-comb generator 310 includes the laser diode 315, the first comb generator 320, and the second comb generator 330 all included in the dual-comb generator 310 in FIG. 4. In addition, the dual-comb generator 310 in FIG. 6B includes a tunable bandpass filter 645. In an embodiment, the tunable bandpass filter 645 is similar to the tunable bandpass filter 630 in FIG. 6A. Different than the dual-comb generator 310 in FIG. 4, the tunable bandpass filter 645 in FIG. 6B is coupled to the first comb generator 320 and configured to receive the first optical frequency comb 322. The tunable bandpass filter 645 is further configured to select one of the optical frequency carriers 327 of the first optical frequency comb 322, which is not the center carrier at the nominal carrier frequency $\omega_c$. The tunable bandpass filter 645 is further configured to transmit the one of the optical frequency carriers 327 to the second comb generator 330 to provide the second optical frequency comb 332 as directed by arrow 332 in FIG. 6B. The nominal carrier frequency of the selected optical frequency carrier 327 is denoted by $\omega_c+\Delta\Omega$, where $\Delta\Omega$ is an integer number of $\Delta\omega_1$. In an embodiment, $\Delta\Omega$ may be adjusted by tuning the working frequency range of the tunable bandpass filter 645 upon request through the user interface 302.

In an embodiment, the tunable bandpass filter 645 may be replaced by a distributed feedback laser with a lasing frequency at $\omega_c+\Delta\Omega$, where $\Delta\Omega=m\Delta\omega_1$ and m is any appropriate integer. Upon receipt of the first optical frequency comb 322 having an optical frequency carrier at the nominal carrier frequency of $\omega_c+\Delta\Omega$, the distributed feedback laser 645 outputs to the second comb generator 330 the second electromagnetic radiation 327 having the nominal carrier frequency of $\omega_c+\Delta\Omega$.

Referring to FIG. 6C, a schematic diagram of a DRFM 650 is depicted. In an embodiment, the DRFM 650 is any one of the plurality of DRFMs $375_{1-N}$. The DRFM 650 is configured to receive a down-converted signal 655 and output an intermediate interfering signal 685. In an embodiment, the down-converted signal 655 is one of the plurality of down-converted signals $358_{1-N}$, and the intermediate interfering signal 685 is one of the plurality of intermediate interfering signals $376_{1-N}$. The DRFM 650 is further configured to provide the intermediate interfering signal 685 by modulating the down-converted signal 655.

As shown, the DRFM 650 includes an analog-to-digital converter (ADC) 660, a memory 665, a digital signal processor (DSP) 670, and a digital-to-analog converter (DAC) 680. The ADC 660 receives the down-converted signal 655 and converted the down-converted signal 655 from an analog format to a digital format. The memory 665 stores the down-converted signal 655 in the digital format. The DSP 670 is configured to obtain the down-converted signal 655 in the digital format and provide a fake digital signal 675 by modulating the down-converted signal 655 in the digital format. In an embodiment, the DSP 670 provides the fake digital signal 675 by introducing one or more time delays to the down-converted signal 655 in the digital format. The one or more time delays are determined according to an instruction 672 through the user interface 602. Alternatively or in addition, the DSP 670 provides the fake digital signal 675 by performing frequency modulation on the down-converted signal 655 in the digital format so that one or more frequency components of the down-converted signal 655 experience shift in frequency. Alternatively or in addition, the DSP 670 provides the fake digital signal 675 by performing amplitude modulation on the down-converted signal 655 in the digital format so that one or more components of the down-converted signal 655 experience change in amplitude. In an embodiment, the user interface 602 is the user interface 302. The DAC 680 is further configured to provide the intermediate interfering signal 685 by converting the fake digital signal 675 from the digital format to the analog format.

Figure 7:
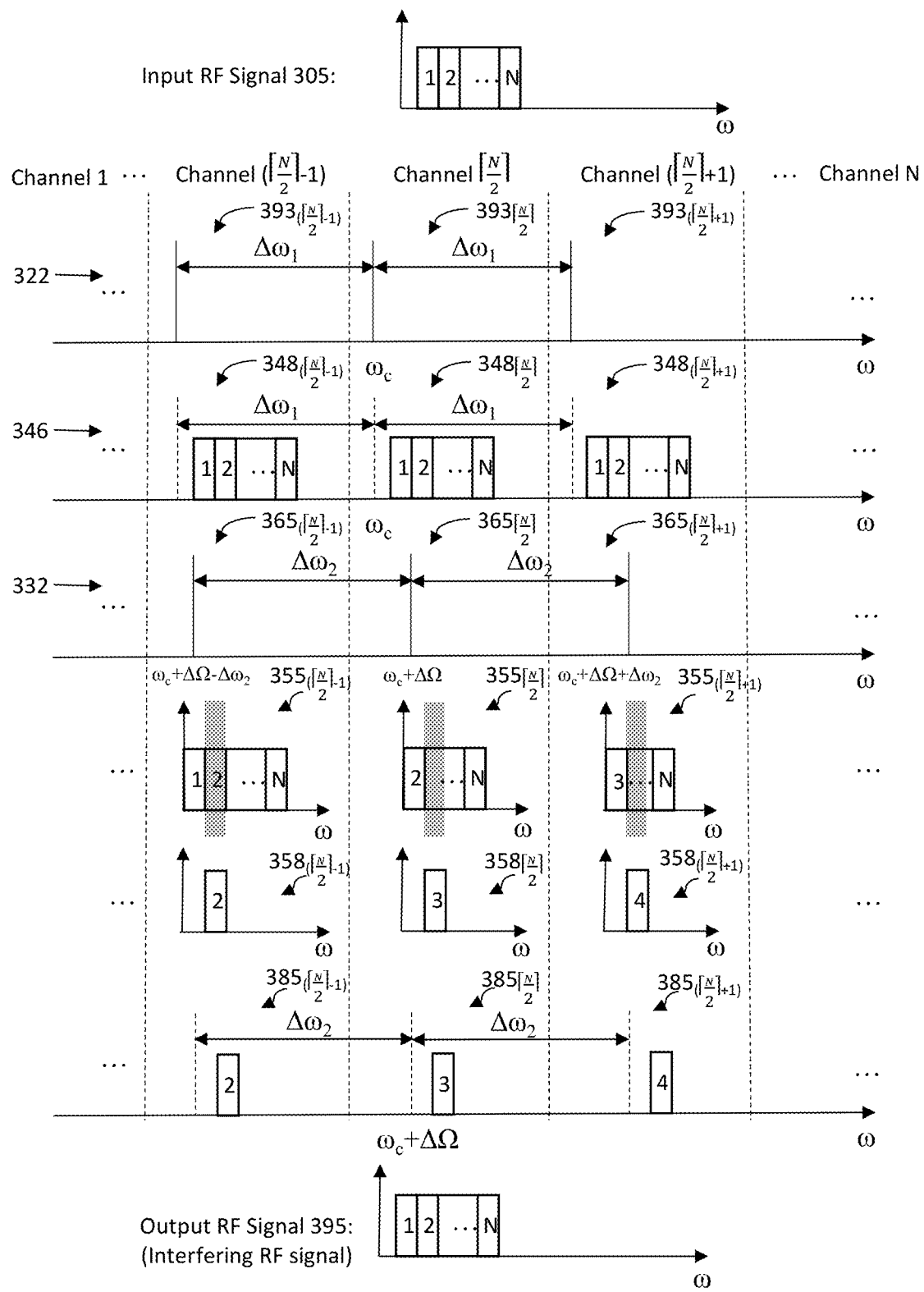
FIG. 7 depicts spectra of various signals generated in the RF signal processor in FIG. 3 for explanation of working principles of the RF signal generator in FIG. 3.

Referring to FIG. 7, spectra of various signals generated in the RF signal processor 300 in FIG. 3 are depicted for explanation of working principles of the RF signal generator 300. For simplicity of explanation, FIG. 7 is provided according to an embodiment when the plurality of down-converted signals $358_{1-N}$ is modulated by the plurality of DRFMs $375_{1-N}$ by introducing one or more time delays. As shown in FIG. 7, the input RF signal 305 includes a plurality of frequency bands numbered from 1 to N. Each of the plurality of frequency bands spans a respective frequency range. In the example of FIG. 7, the input RF signal 305 spans a continuous frequency range, which means there is no gap between the frequency ranges covered by the plurality of frequency bands included in the input RF signal 305. In some other examples, the input RF signal 305 may span discrete (i.e., discontinuous) frequency ranges, which means there are one or more gaps between the frequency ranges spanned by the plurality of frequency bands included in the input RF signal 305.

An example of the first optical frequency comb 322 provided by the dual-comb generator 310 is shown in FIG. 7. As shown, the first optical frequency comb 322 includes N optical frequency carriers. The spacing between adjacent optical frequency carriers of the first optical frequency comb 322 is $\Delta\omega_1$.

The SC-SSB modulator 345 in FIG. 3 performs an SC-SSB modulation which allows the SC-SSB modulator 345 to provide the modulated signal 346 as shown in FIG. 7 by modulating the input RF signal 305 on a single side of each optical frequency carrier of the first optical frequency comb 322 with the optical frequency carriers of the first optical frequency comb 322 suppressed. In this example, the input RF signal 305 is modulated on the right side of each optical frequency carrier of the first optical frequency comb 322. In some other examples, the input RF signal 305 is modulated on the left side of each optical frequency carrier of the first optical frequency comb 322. Subsequently, the first demultiplexer 347 in FIG. 3 splits the modulated signal 346 to N channelized modulated signals $348_{1-N}$ in N different channels as separated by vertical dashed lines in FIG. 7.

An example of the second optical frequency comb 332 provided by the dual-comb generator 310 is shown in FIG. 7. As shown, the second optical frequency comb 332 includes N optical frequency carriers. The spacing between adjacent optical frequency carriers of the first optical frequency comb 332 is $\Delta\omega_2$. As seen, the center frequency of the second optical frequency comb 332 differs from the center frequency of the first optical frequency comb 322. The second demultiplexer 364 provides each optical frequency carrier $365_{1-N}$ of the second optical frequency comb 332 through a respective one the N output channels.

The intermediate RF signal $355_i$ ($1 \le i \le N$) is generated based on a channelized modulated signal $348_i$ and an optical frequency carrier $365_i$ of the second optical frequency comb 332. The intermediate RF signal $355_i$ includes at least a portion of the channelized modulated signal $348_i$ which is on one side of the optical frequency carrier $365_i$ in the frequency domain, with the remaining portion of the channelized modulated signal $348_i$ which is on the other side of the optical frequency carrier $365_i$ in the frequency domain significantly suppressed. Specifically in FIG. 7, the intermediate RF signal $355_i$ includes at least a portion of the channelized modulated signal $348_i$ which is on the right side of the optical frequency carrier $365_i$ in the frequency domain. The remaining portion of the channelized modulated signal $348_i$ which is on the left side of the optical frequency carrier $365_i$ in the frequency domain is significantly suppressed. In some other examples, the intermediate RF signal $355_i$ includes at least a portion of the channelized modulated signal $348_i$ which is on the left side of the optical frequency carrier $365_i$ in the frequency domain. The remaining portion of the channelized modulated signal $348_i$ which is on the right side of the optical frequency carrier $365_i$ in the frequency domain is significantly suppressed.

The bandpass filters $356_{1-N}$ (whose profiles are denoted by gray boxes in FIG. 7) are further configured to provide the down-converted signals $358_{1-N}$ by filtering out a portion of the intermediate RF signal $355_{1-N}$ within a same frequency range determined by the working bandwidth or the working frequency ranges of the bandpass filters $356_{1-N}$.

The spectra of the intermediate interfering signal $376_i$, as shown in FIG. 7, are similar to the spectra of the down-converted signals $358_{1-N}$ This is because introducing a time delay in time domain is equivalent to adding an additional phase in frequency domain according based on Fourier transforms, and adding an additional phase in frequency domain will not vary the frequency spectra.

In FIG. 7, the modulated signals $385_{1-N}$ provided by the SC-SSB modulators $384_{1-N}$ are shown. The modulated signals $385_{1-N}$ are generated by performing an SC-SSB modulation which allows the SC-SSB modulator $384_{1-N}$ to modulate the intermediate interfering signals $376_{1-N}$ on one side of the optical frequency carriers $365_{1-N}$ of the second optical frequency combs 332. As shown in FIG. 7, the SC-SSB modulation is performed by the SC-SSB modulator $384_{1-N}$ to modulate the intermediate interfering signals $376_{1-N}$ on the right side of the optical frequency carriers $365_{1-N}$ of the second optical frequency combs 332, respectively.

Further, a plurality of up-converted signals $388_{1-N}$ is provided by performing frequency beating between each optical frequency carrier $393_{1-N}$ of the first optical frequency combs 322 and each of the modulated signals $385_{1-N}$ by the photodetectors $386_{1-N}$. The interfering RF output signal 395 is further provided as shown in FIG. 7 by combining the plurality of up-converted signals $388_{1-N}$.

FIGS. 8-17 show various experimental measurement and simulation results.

Figure 8:
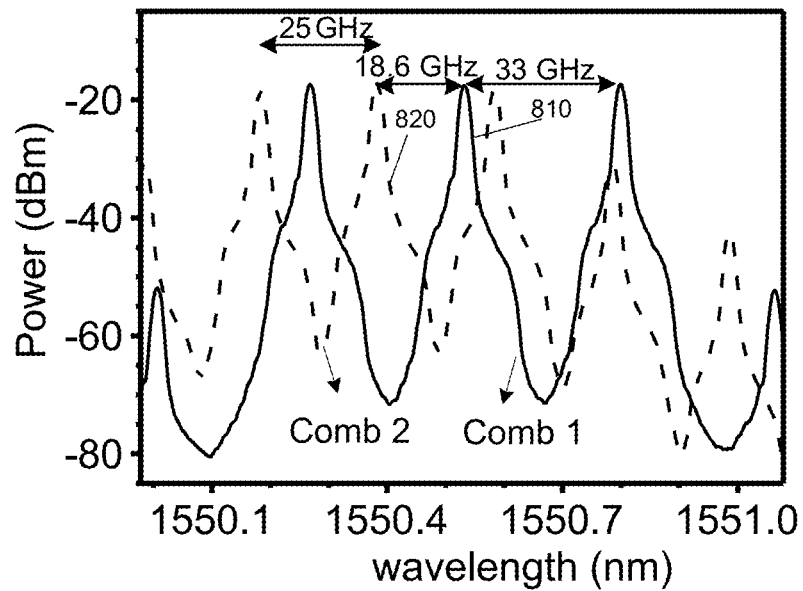
FIG. 8 depicts optical spectra of a first optical frequency comb and a second optical frequency comb generated by a dual-comb generator according to an embodiment of the disclosure.

Referring to FIG. 8, optical spectra of a first optical frequency comb (as shown in solid lines) and a second optical frequency comb (as shown in dashed lines) generated by a dual-comb generator according to an embodiment of the disclosure. In an embodiment, the first optical frequency comb is the first optical frequency comb 322, the second optical frequency comb is the second optical frequency comb 332, and the dual-comb generator is the dual-comb generator 310. As shown, the spacing between adjacent optical frequency carriers of the first optical frequency comb is 33 GHz, and the spacing between adjacent optical frequency carriers of the second optical frequency comb is 25 GHz. A difference between a nominal carrier frequency of a center frequency carrier 810 of the first optical frequency comb and a nominal carrier frequency of a center frequency carrier 820 of the second optical frequency comb is 18.6 GHz.

FIGS. 9-13 show experimental measurements and simulation results related to the RF signal processor 300 when the RF input signal 305 spans a frequency range within X band as a non-limiting example. In this example, the RF input signal 305 has the frequency range between 11.1 GHz and 11.5 GHz.

Figure 9:
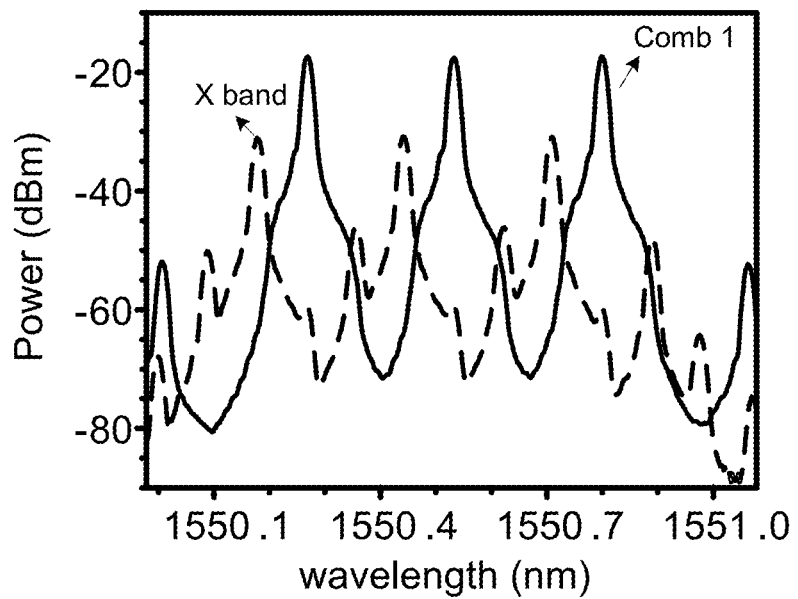
FIG. 9 depicts an optical spectrum of a first optical frequency comb as shown in solid lines and an optical spectrum of a modulated signal generated by a suppressed-carrier single sideband modulator by modulating an RF input signal (within X band) on one side of each optical frequency carrier of the first optical frequency comb as shown in dotted lines according to an embodiment of the disclosure.

Referring to FIG. 9, an optical spectrum of the first optical frequency comb as shown in solid lines and an optical spectrum of a modulated signal generated by an SC-SSB modulator by modulating the RF input signal (within X band) on each optical frequency carrier of the first optical frequency comb as shown in dotted lines are depicted according to an embodiment of the disclosure. In an embodiment, the first optical frequency comb is the first optical frequency comb 322. In an embodiment, the modulated signal is the modulated signal 346. In an embodiment, the RF input signal is the RF input signal 305. As shown in this example, the RF input signal is modulated on the left side of each optical frequency carrier of the first optical frequency comb with all the optical frequency carriers of the first optical frequency comb suppressed. In some other example, the RF input signal may be modulated on the right side of each optical frequency carrier of the first optical frequency comb.

Figure 10:
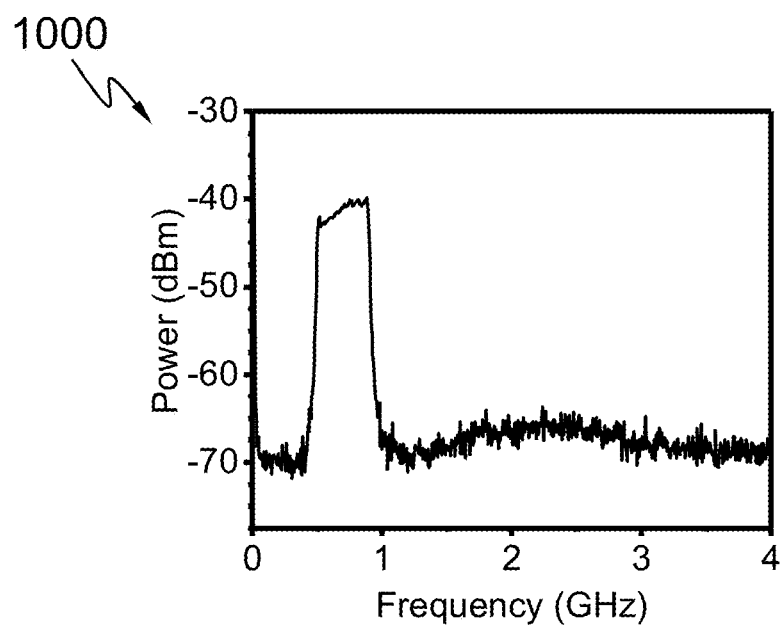
FIG. 10 depicts an RF spectrum of a down-converted signal according to an embodiment of the disclosure.

Referring to FIG. 10, an RF spectrum 1000 of a down-converted signal is depicted according to an embodiment of the disclosure. As shown, the down-converted signal spans a frequency range between 0.5 GHz and 0.9 GHz. In an embodiment, the down-converted signal is one of the plurality of down-converted signals $358_{1-N}$ in FIG. 3.

Figure 11:
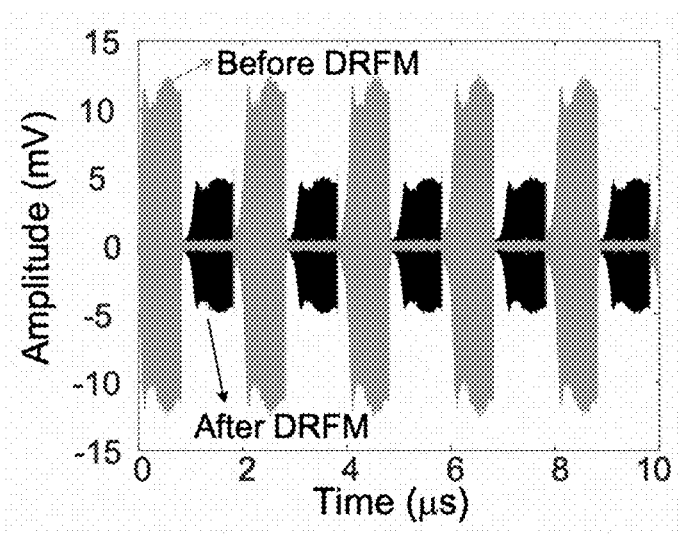
FIG. 11 depicts a waveform of a down-converted signal before processed by a DRFM and a waveform of an intermediate interfering signal after processed by the DRFM according to an embodiment of the disclosure.

Referring to FIG. 11, a waveform of the down-converted signal (as shown in gray) before processed by a DRFM and a waveform of the intermediate interfering signal (as shown in black) after processed by the DRFM are depicted according to an embodiment of the disclosure. As shown in FIG. 11, the DRFM provides the intermediate interfering signal by introducing a fake time delay in addition to perform amplitude modulation with respect to the down-converted signal. In an embodiment, the down-converted signal is one of the plurality of down-converted signals $358_{1-N}$ in FIG. 3, which is an input to one of the plurality of DRFMs $375_{1-N}$. The intermediate interfering signal is one of the plurality of intermediate interfering signals $376_{1-N}$, which is an output of the one of the plurality of DRFMs $375_{1-N}$ upon receipt of the down-converted signal.

Figure 12:
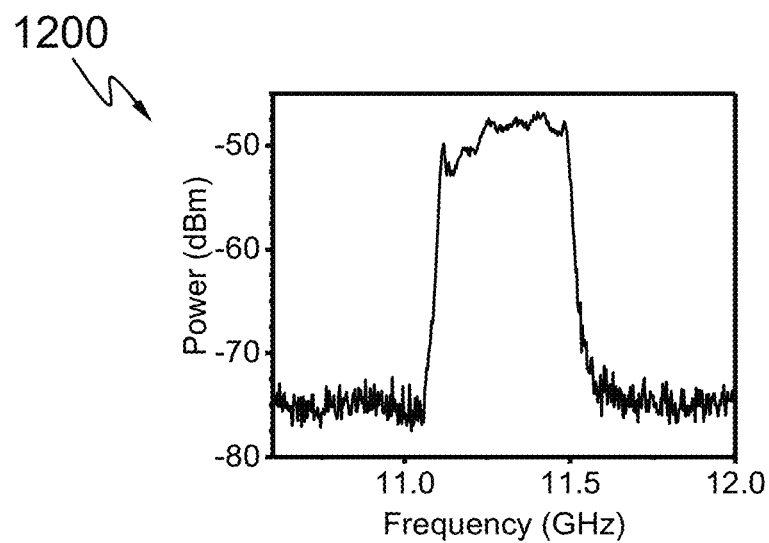
FIG. 12 depicts an RF spectrum of an interfering RF output signal according to an embodiment of the disclosure.

Referring to FIG. 12, an RF spectrum 1200 of the interfering RF output signal is depicted according to an embodiment of the disclosure. In an embodiment, the interfering RF output signal is the interfering RF output signal 395. In an embodiment, the interfering RF output signal is the interfering RF output signal 260 in FIG. 2. As shown, the interfering RF output signal spans a frequency range between 11.1 and 11.5 GHz, the same as the RF input signal.

Figure 13:
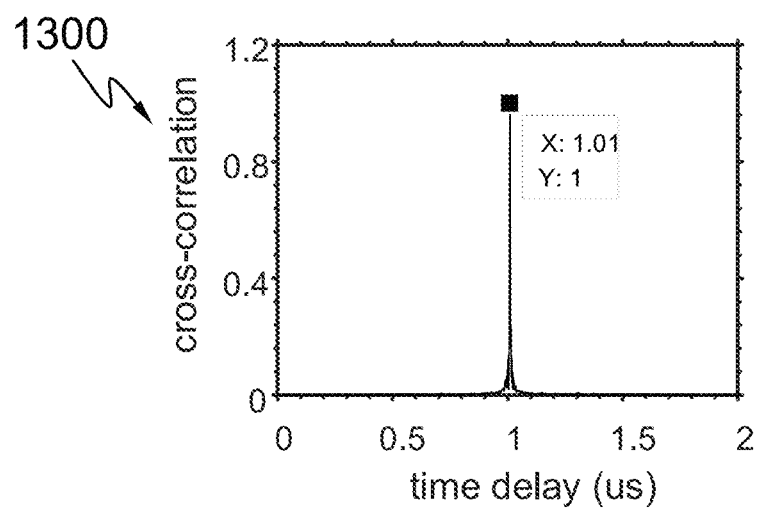
FIG. 13 depicts a cross-correlation of an RF input signal and an interfering RF output signal according to an embodiment of the disclosure.

Referring to FIG. 13, a cross-correlation 1300 of the RF input signal (not shown) and the interfering RF output signal (as shown in FIG. 12) is depicted according to an embodiment of the disclosure. The cross-correlation is calculated by a first party which transmits the RF input signal to a second party and subsequently receives the interfering RF output signal from the second party. As shown, the cross-correlation suggests a time delay of 1.01 micron second (μs) between a first time when the first party transmits the RF input signal and the second time when the first party receives the interfering RF output signal. This also suggests that the relative distance between the first party and the second party is 151.5 meters, as a product of half of a speed of light, which is $1.5 \times 10^8$ meter/s, and the determined time delay, which is 1.01 μs. As we discussed before, the determined time delay and the relative distance between the first party and the second party are inaccurate because the interfering RF output signal includes fake time delay information provided by DRFM(s). In an embodiment, the cross-correlation may be calculated by the processor 105 in FIG. 2 after the radar 102 receives the interfering RF output signal 260. In an embodiment, the first party is the first party 220 and the second party is the second party 250 in FIG. 2.

Figure 14:
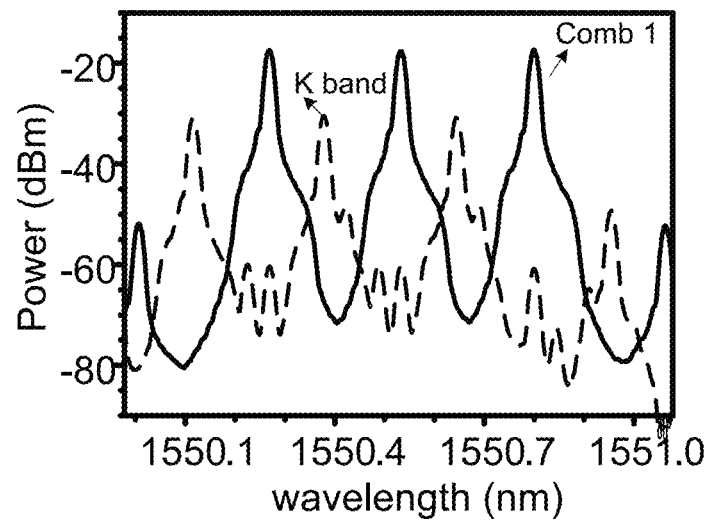
FIG. 14 depicts an optical spectrum of a first optical frequency comb as shown in solid lines and an optical spectrum of a modulated signal generated by a suppressed-carrier single sideband modulator by modulating an RF input signal (within K band) on one side of each optical frequency carrier of the first optical frequency comb as shown in dotted lines according to an embodiment of the disclosure.
Figure 15:
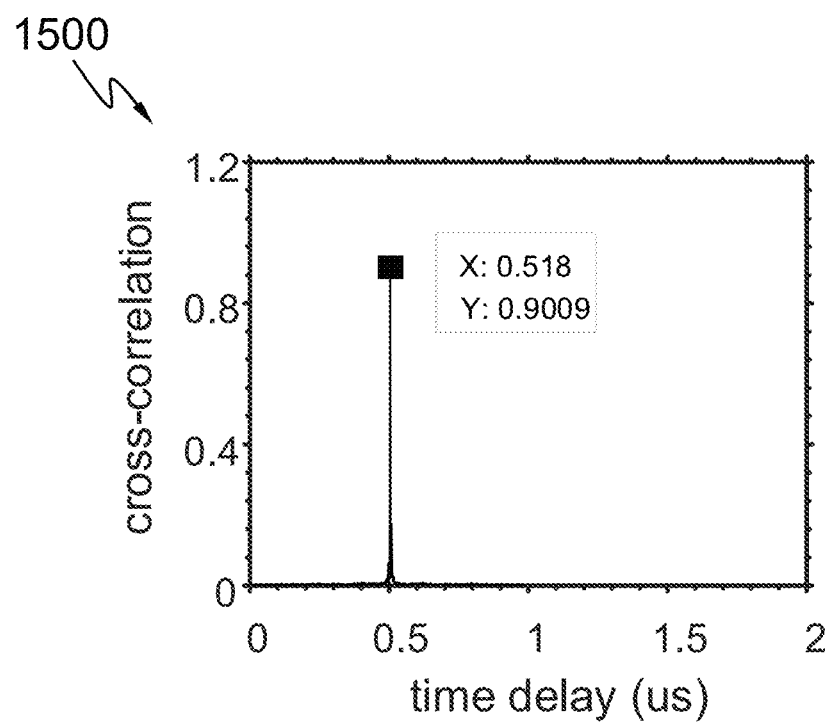
FIG. 15 depicts a cross-correlation of an RF input signal and an interfering RF output signal according to an embodiment of the disclosure.

FIGS. 14-15 show experimental measurements and simulation results related to the RF signal processor 300 when the RF input signal 305 spans a frequency range within K band as a non-limiting example. In this example, the RF input signal 305 has the frequency range between 19.1 GHz and 19.5 GHz.

Referring to FIG. 14, an optical spectrum of the first optical frequency comb as shown in solid lines and an optical spectrum of a modulated signal generated by an SC-SSB modulator by modulating the RF input signal (within K band) on each optical frequency carrier of the first optical frequency comb as shown in dotted lines are depicted according to an embodiment of the disclosure. In an embodiment, the first optical frequency comb is the first optical frequency comb 322. In an embodiment, the modulated signal is the modulated signal 346. In an embodiment, the RF input signal is the RF input signal 305. As shown in this example, the RF input signal is modulated on the left side of each optical frequency carrier of the first optical frequency comb with all the optical frequency carriers of the first optical frequency comb suppressed. In some other example, the RF input signal may be modulated on the right side of each optical frequency carrier of the first optical frequency comb.

Referring to FIG. 15, a cross-correlation 1500 of the RF input signal and an interfering RF output signal provided by the RF signal processor 300 based on the first optical frequency comb and the second optical frequency comb in FIG. 8 is depicted according to an embodiment of the disclosure. The cross-correlation 1500 is calculated by a first party which transmits the RF input signal to a second party and subsequently receives the interfering RF output signal from the second party. As shown, the cross-correlation suggests a time delay of 0.518 micron second (µs) between a first time when the first party transmits the RF input signal and the second time when the first party receives the interfering RF output signal. This also suggests that the relative distance between the first party and the second party is 77.7 meters, as a product of half of a speed of light, which is $1.5 \times 10^8$ meter/s, and the determined time delay, which is 0.518 µs. As we discussed before, the determined time delay and the relative distance between the first party and the second party are inaccurate because the interfering RF output signal includes fake time delay information provided by DRFM(s). In an embodiment, the cross-correlation may be calculated by the processor 105 in FIG. 2 after the radar 102 receives the interfering RF output signal 260. In an embodiment, the first party is the first party 220 and the second party is the second party 250 in FIG. 2.

Figure 16:
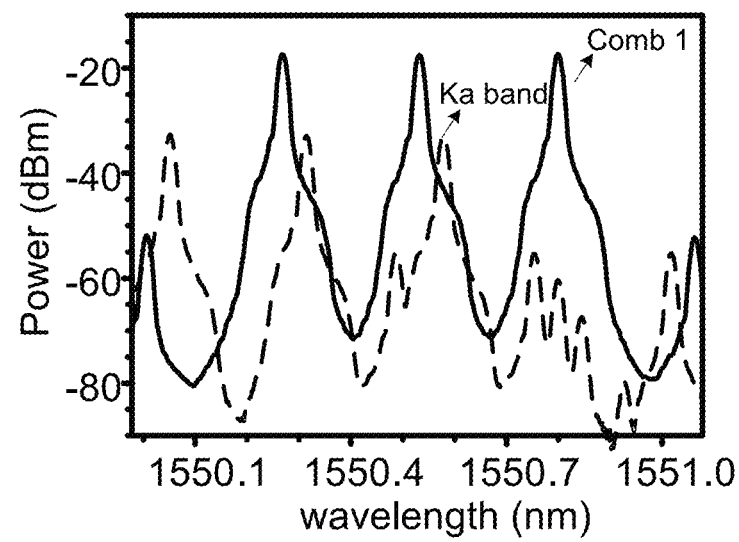
FIG. 16 depicts an optical spectrum of a first optical frequency comb as shown in solid lines and an optical spectrum of a modulated signal generated by a suppressed-carrier single sideband modulator by modulating an RF input signal (within Ka band) on one side of each optical frequency carrier of the first optical frequency comb as shown in dotted lines according to an embodiment of the disclosure.
Figure 17:
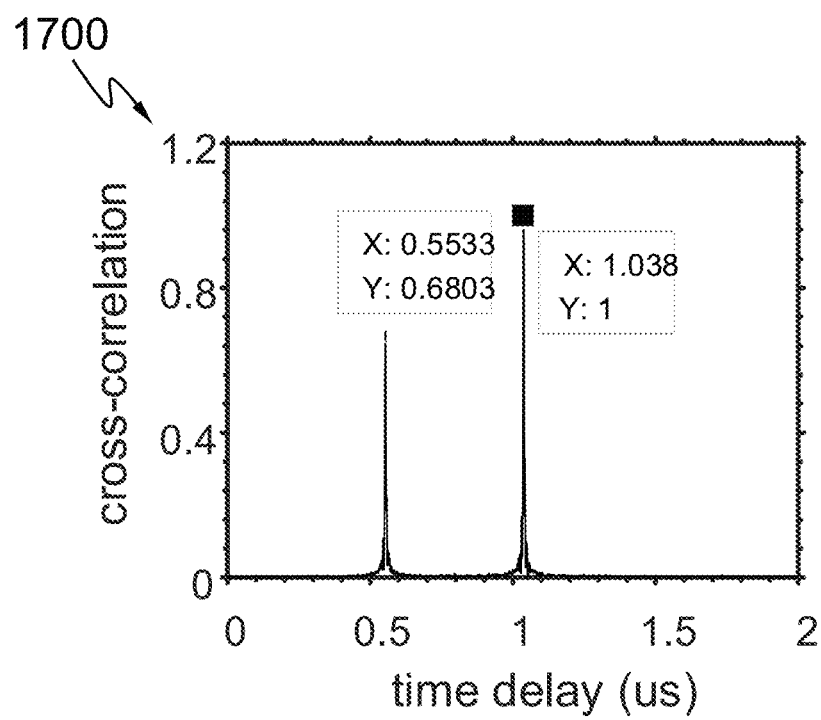
FIG. 17 depicts a cross-correlation of an RF input signal and an interfering RF output signal according to an embodiment of the disclosure.

FIGS. 16-17 show experimental measurements and simulation results related to the RF signal processor 300 when the RF input signal 305 spans a frequency range within Ka band as a non-limiting example. In this example, the RF input signal 305 has the frequency range between 27.1 GHz and 27.5 GHz.

Referring to FIG. 16, an optical spectrum of the first optical frequency comb as shown in solid lines and an optical spectrum of a modulated signal generated by an SC-SSB modulator by modulating the RF input signal (within Ka band) on each optical frequency carrier of the first optical frequency comb as shown in dotted lines are depicted according to an embodiment of the disclosure. In an embodiment, the first optical frequency comb is the first optical frequency comb 322. In an embodiment, the modulated signal is the modulated signal 346. In an embodiment, the RF input signal is the RF input signal 305. As shown in this example, the RF input signal is modulated on the left side of each optical frequency carrier of the first optical frequency comb with all the optical frequency carriers of the first optical frequency comb suppressed. In some other example, the RF input signal may be modulated on the right side of each optical frequency carrier of the first optical frequency comb.

Referring to FIG. 17, a cross-correlation 1700 of the RF input signal and an interfering RF output signal provided by the RF signal processor 300 based on the first optical frequency comb and the second optical frequency comb in FIG. 8 is depicted according to an embodiment of the disclosure. The cross-correlation 1700 is calculated by a first party which transmits the RF input signal and subsequently receives the interfering RF output signal. As shown, the cross-correlation 1700 suggests a first time delay of 0.5533 micron second (µs) between a first time when the first party transmits the RF input signal and the second time when the first party receives a first peak of the interfering RF output signal. The cross-correlation 1700 also suggests a second time delay of 1.038 µs between the first time when the first party transmits the RF input signal and a third time when the first party receives a second peak of the interfering RF output signal. In addition, this suggests two objects including a second party and a third party are detected. A first relative distance between the first party and the second party is 82.995 meters, as a product of half of a speed of light, which is $1.5 \times 10^8$ meter/s, and the determined first time delay, which is 0.5533 µs. A second relative distance between the first party and the third party is 155.7 meters, as a product of half of a speed of light, which is $1.5 \times 10^8$ meter/s, and the determined second time delay, which is 1.038 µs. As we discussed before, none of the first time delay, the second time delay, the first relative distance and the second relative distance is accurate or real because the interfering RF output signal includes fake time delay information provided by DRFM(s). In an embodiment, the cross-correlation may be calculated by the processor 105 in FIG. 2 after the radar 102 receives the interfering RF output signal 260.

Figure 18:
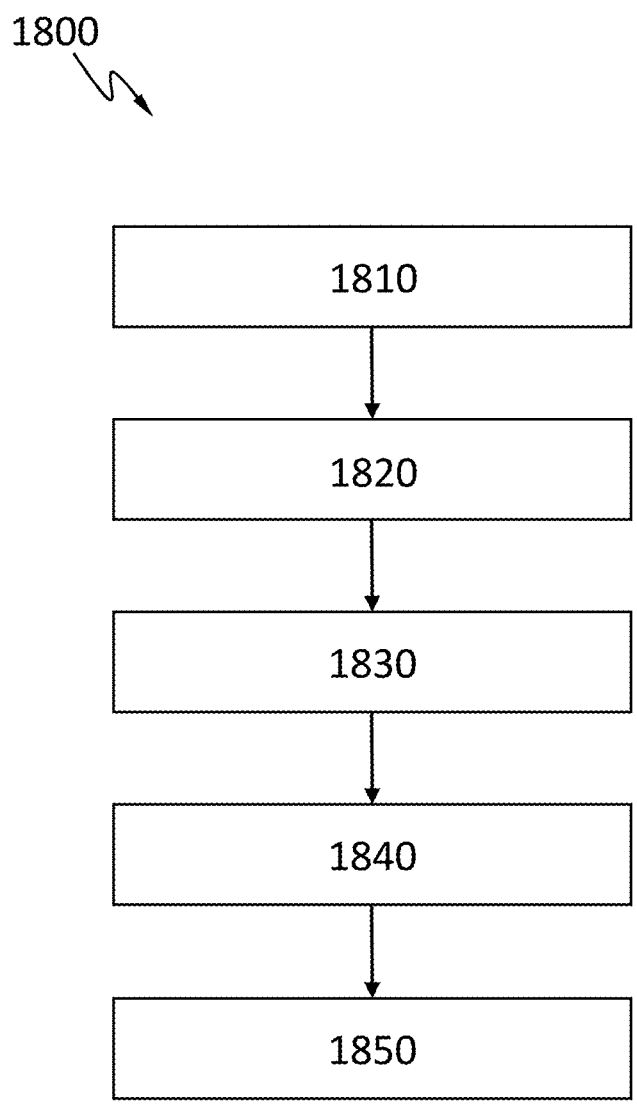
FIG. 18 is a flowchart of an exemplary process for providing an interfering RF output signal based on an RF input signal according to an embodiment of the disclosure.

Referring to FIG. 18, a flowchart 1800 of an exemplary process for providing an interfering RF output signal based on an RF input signal is shown according to an embodiment of the disclosure. In an embodiment, the exemplary process as shown in the flowchart 1800 may be performed by the RF signal processor 300.

At step 1810, an RF input signal is received. In an embodiment, the RF input signal includes a plurality of frequency bands. In an embodiment, the RF input signal spans a first frequency range within a second frequency range. In an embodiment, the plurality of frequency bands included in the RF input signal collectively corresponds to the first frequency range. In an embodiment, the second frequency range corresponds to without limitation L band, S band, C band, X band, Ku band, K band, Ka band, U band, E band, and/or F band.

At step 1820, a plurality of down-converted signals is provided by converting each of the plurality of frequency bands of the RF input signal down to a target frequency range upon receipt of the RF input signal. In an embodiment, each frequency in the target frequency range is less than each frequency in the second frequency range. In an embodiment, the plurality of down-converted signals is provided based on a first optical frequency comb and a second optical frequency comb. In an embodiment, the first optical frequency comb and the second optical frequency comb are provided based on a continuous wave laser diode, each of the first optical frequency comb and the second optical frequency comb having a plurality of equally spaced optical frequency carriers. In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb. In an embodiment, the first optical frequency comb is the first optical frequency comb 322. In an embodiment, the second optical frequency comb is the second optical frequency comb 332.

At step 1830, a plurality of intermediate interfering signals is provided by modulating at least one of the plurality of down-converted signals. In an embodiment, the plurality of intermediate interfering signals is provided by introducing one or more time delay with respect to the at least one of the plurality of down-converted signals. Alternatively or in addition, the plurality of intermediate interfering signals is provided by performing frequency modulation on the at least one of the plurality of down-converted signals. Alternatively or in addition, the plurality of intermediate interfering signals is provided by performing amplitude modulation on the at least one of the plurality of down-converted signals.

At step 1840, a plurality of up-converted signals is provided by converting the plurality of intermediate interfering signals all within the target frequency range collectively up to a third frequency range. In an embodiment, the third frequency range is within the second frequency range. In an embodiment, the plurality of up-converted signals is provided by converting the plurality of intermediate interfering signals all within the target frequency range up to the third frequency range based on the first optical frequency comb and the second optical frequency comb. In an embodiment, the providing the plurality of up-converted signals by converting the plurality of intermediate interfering signals all within the target frequency range up to the third frequency range includes providing a first modulated signal by modulating one of the plurality of the intermediate interfering signals on a first side of a corresponding optical frequency carrier of the second optical frequency comb with the corresponding optical frequency carrier of the second optical frequency comb suppressed, and providing an up-converted signal of the plurality of up-converted signals to an RF combiner upon receipt of an optical frequency carrier of the first optical frequency comb and the first modulated signal.

At step 1850, an interfering RF output signal is provided by combining the plurality of up-converted signals, wherein the interfering RF output signal spans the third frequency range. In an embodiment, the first frequency range is the third frequency range when each of the plurality of intermediate interfering signals spans a same frequency range as the target frequency range. In an embodiment, the first frequency range is not the third frequency range when each of the plurality of intermediate interfering signals does not span a same frequency range as the target frequency range.

In an embodiment, the converting each of the plurality of frequency bands of the RF input signal down to the target frequency range upon receipt of the RF input signal, at step 1820, includes performing a suppressed-carrier single sideband modulation by modulating the RF input signal on a second side of each optical frequency carrier of the first optical frequency comb with all optical frequency carriers of the first optical frequency comb suppressed, the second side being the same as the first side. In an embodiment, the first side and the second side are both the left side. In an embodiment, the first side and the second side are both the right side.

Figure 19:
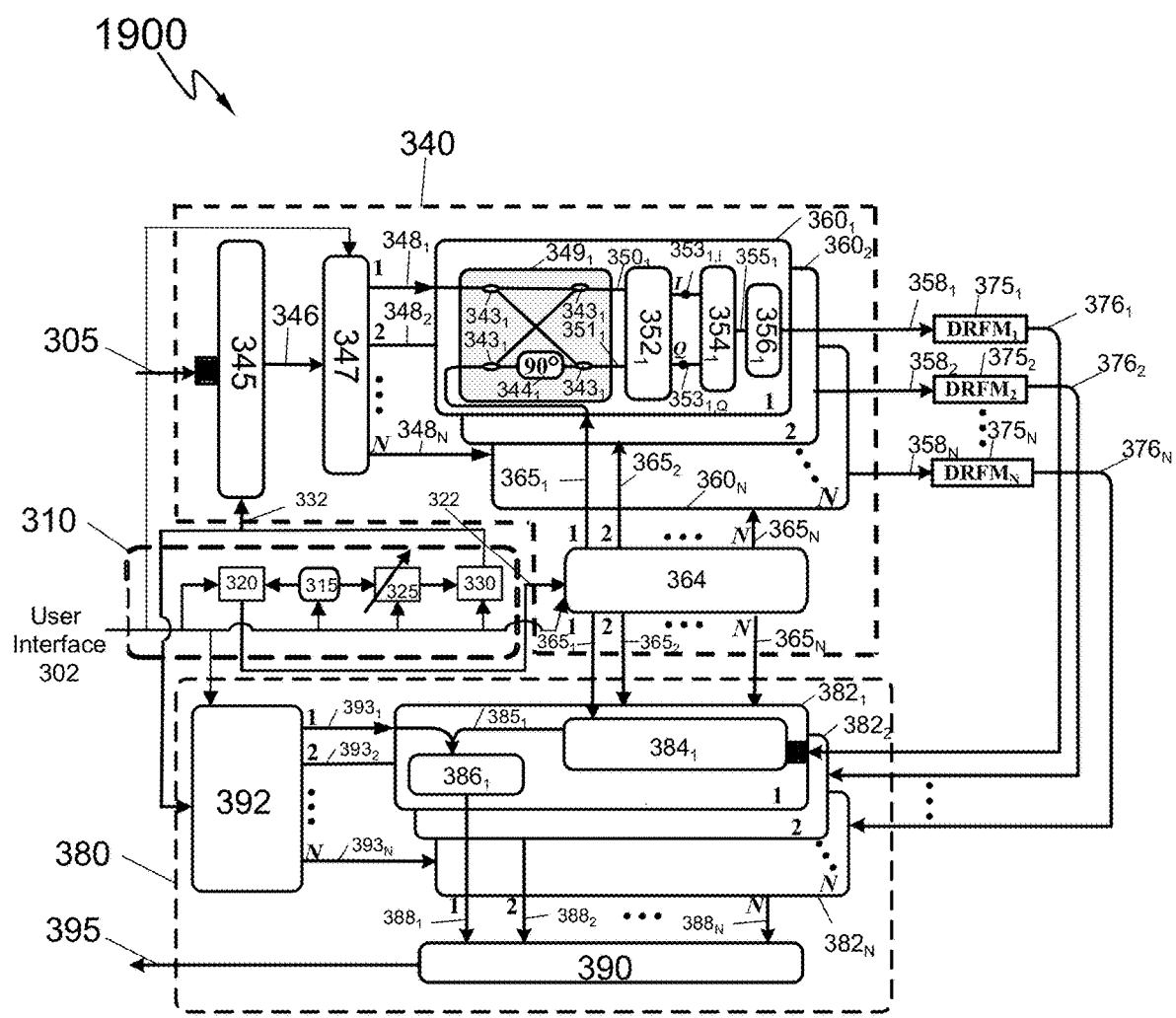
FIG. 19 is a schematic diagram of an RF signal processor according to an embodiment of the disclosure.

Referring to FIG. 19, a schematic diagram of an RF signal processor 1900 is depicted according to an embodiment of the disclosure. In an embodiment, the RF signal processor 1900 is the RF signal processor 280. As shown, the RF signal processor 1900 receives an RF input signal 305 and outputs an interfering RF output signal 395. In an embodiment, the RF input signal 305 is the RF input signal 130, and the interfering RF output signal 395 is the interfering RF output signal 260 in FIG. 2.

As shown, the RF signal processor 1900 includes the dual-comb generator 310, the signal modulator 340, the plurality of DRFMs 375$_{1-N}$, and the interfering signal generator 380, which are also included in the RF signal processor 300. However, the various components of the RF signal processor 1900 are coupled with each other and operated differently than those of the RF signal processor 300 as described below.

As shown in FIG. 19, the SC-SSB modulator 345 is coupled to the dual-comb generator 310 so as to receive the second optical frequency comb 332, rather than the first optical frequency comb 322, from the dual-comb generator 310. The second demultiplexer 364 is coupled to the dual-comb generator 310 so as to receive the first optical frequency comb 322, rather than the second optical frequency comb 332, from the dual-comb generator 310. The demultiplexer 392 is coupled to the dual-comb generator 310 so as to receive the second optical frequency comb 332, rather than the first optical frequency comb 322, from the dual-comb generator 310.

The SC-SSB modulator 345 is configured to perform an SC-SSB modulation upon receipt of the RF input signal 305 and the second optical frequency comb 332. The SC-SSB modulation allows the SC-SSB modulator 345 to provide a modulated signal 346 by modulating the RF input signal 305 on a first side of each optical frequency carrier of the second optical frequency comb 332 with all optical frequency carriers of the second optical frequency comb 332 suppressed. In an embodiment, the first side is the left side. Accordingly, the SC-SSB modulation allows the SC-SSB modulator 345 to provide the modulated signal 346 by modulating the RF input signal 305 on the left side of each optical frequency carrier of the second optical frequency comb 332 with all optical frequency carriers of the second optical frequency comb 332 suppressed. Alternatively, the first side is the right side. Accordingly, the SC-SSB modulation allows the SC-SSB modulator 345 to provide the modulated signal 346 by modulating the RF input signal 305 on the right side of each optical frequency carrier of the second optical frequency comb 332 with all optical frequency carriers of the second optical frequency comb 332 suppressed. The SC-SSB modulator 345 is further configured to provide the modulated signal 346 to the first demultiplexer 347.

The second demultiplexer 364 is configured to split the first optical frequency comb 322 to a plurality of optical frequency carriers and provide each optical frequency carrier 365$_{1-N}$ of the first optical frequency comb 322 to a respective one of the plurality of down-converters 360$_{1-N}$. The second demultiplexer 364 is further configured to provide each optical frequency carrier 365$_{1-N}$ of the first optical frequency comb 322 to the interfering signal generator 380.

The demultiplexer 392 is configured to receive the second optical frequency comb 332 from the dual-comb generator 310, split the second optical frequency comb 332 to a plurality of optical frequency carriers 393$_{1-N}$ individually, and provide each optical frequency carrier 393$_{1-N}$ to a respective one of the plurality of up-converters 382$_{1-N}$. A number of output channels of the demultiplexer 392 and respective frequency ranges of the output channels of the demultiplexer 392 may be reconfigurable upon request from the user interface 302.

The SC-SSB modulator 384$_i$ is configured to perform an SC-SSB modulation upon receipt of the optical frequency carrier 365$_i$ of the first optical frequency comb 322 and the intermediate interfering signal 376$_i$. The SC-SSB modulation allows the SC-SSB modulator 384$_i$ to provide a modulated signal 385$_i$ by modulating the intermediate interfering signal 376$_i$ on a second side of the optical frequency carrier 365$_i$ with the optical frequency carriers 365$_i$ suppressed. The second side is the same as the first side which was described above with regard to the SC-SSB modulator 345. This means, when the SC-SSB modulator 345 provides the modulated signal 346 by modulating the RF input signal 305 on the left side of each optical frequency carrier of the second optical frequency comb 332 with all optical frequency carriers of the second optical frequency comb 332 suppressed, the SC-SSB modulator $384_i$ provides the modulated signal $385_i$ by modulating the intermediate interfering signal $376_i$ on the left side of the optical frequency carrier $365_i$ of the first optical frequency comb 322 with the optical frequency carriers $365_i$ suppressed. Alternatively, when the SC-SSB modulator 345 provides the modulated signal 346 by modulating the RF input signal 305 on the right side of each optical frequency carrier of the second optical frequency comb 332 with all optical frequency carriers of the second optical frequency comb 332 suppressed, the SC-SSB modulator $384_i$ provides the modulated signal $385_i$ by modulating the intermediate interfering signal $376_i$ on the right side of the optical frequency carrier $365_i$ with the optical frequency carriers $365_i$ suppressed.

The photodetector $386_i$ is coupled to an output channel of the demultiplexer 392 and configured to receive the optical frequency carrier $393_i$ of the second optical frequency comb 332. The photodetector $386_i$ is coupled to the SC-SSB modulator $384_i$ and is configured to receive the modulated signal $385_i$. The photodetector $386_i$ is further coupled to an input channel of the RF combiner 390 and is configured to generate the up-converted signal $388_i$ by performing a frequency beating of the optical frequency carrier $393_i$ of the second optical frequency comb 332 and the modulated signal $385_i$ and provide the up-converted signal $388_i$ to the RF combiner 390 through the respective input channel of the RF combiner 390. The RF combiner 390 further provides the interfering RF output signal 395 by combining the plurality of up-converted signals $388_{1-N}$.

Figure 20:
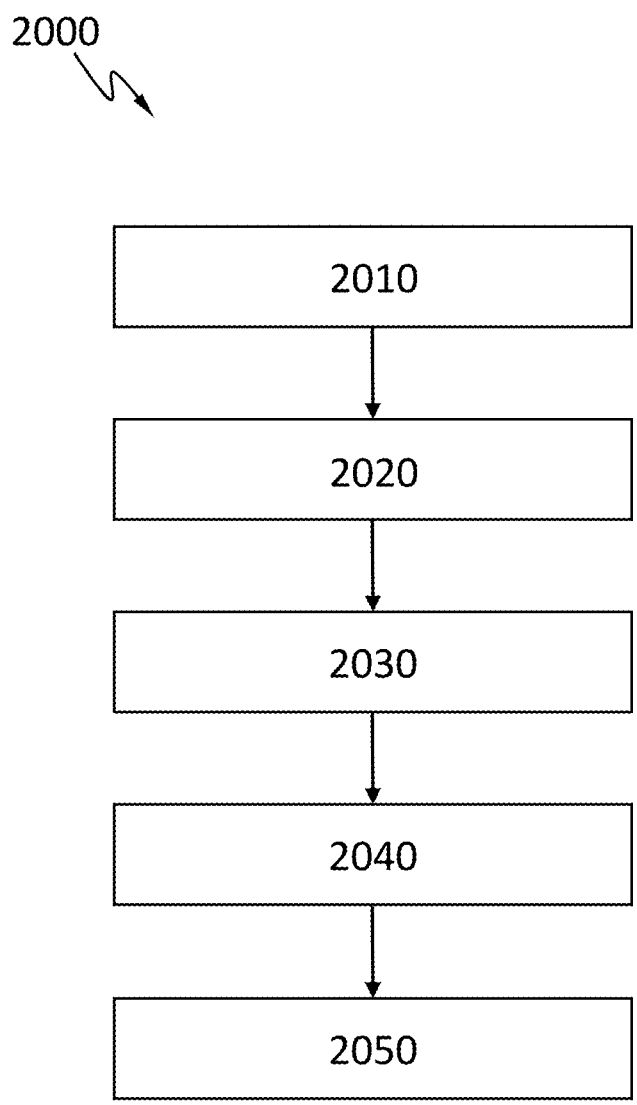
FIG. 20 is a flowchart of an exemplary process for providing an interfering RF output signal based on an RF input signal according to an embodiment of the disclosure.

Referring to FIG. 20, a flowchart 2000 of an exemplary process for providing an interfering RF output signal based on an RF input signal is shown according to an embodiment of the disclosure. In an embodiment, the exemplary process as shown in the flowchart 2000 may be performed by the RF signal processor 1900.

At step 2010, an RF input signal is received. In an embodiment, the RF input signal includes a plurality of frequency bands. In an embodiment, the RF input signal spans a first frequency range within a second frequency range. In an embodiment, the plurality of frequency bands included in the RF input signal collectively corresponds to the first frequency range. In an embodiment, the second frequency range corresponds to without limitation L band, S band, C band, X band, Ku band, K band, Ka band, U band, E band, and/or F band.

At step 2020, a plurality of down-converted signals is provided by converting each of the plurality of frequency bands of the RF input signal down to a target frequency range upon receipt of the RF input signal. In an embodiment, each frequency in the target frequency range is less than each frequency in the second frequency range. In an embodiment, the plurality of down-converted signals is provided based on a first optical frequency comb and a second optical frequency comb. In an embodiment, the first optical frequency comb and the second optical frequency comb are provided based on a continuous wave laser diode, each of the first optical frequency comb and the second optical frequency comb having a plurality of equally spaced optical frequency carriers. In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb. In an embodiment, the first optical frequency comb is the first optical frequency comb 322. In an embodiment, the second optical frequency comb is the second optical frequency comb 332.

At step 2030, a plurality of intermediate interfering signals is provided by modulating at least one of the plurality of down-converted signals. In an embodiment, the plurality of intermediate interfering signals is provided by introducing one or more time delay with respect to the at least one of the plurality of down-converted signals. Alternatively or in addition, the plurality of intermediate interfering signals is provided by performing frequency modulation on the at least one of the plurality of down-converted signals. Alternatively or in addition, the plurality of intermediate interfering signals is provided by performing amplitude modulation on the at least one of the plurality of down-converted signals.

At step 2040, a plurality of up-converted signals is provided by converting the plurality of intermediate interfering signals all within the target frequency range collectively up to a third frequency range. In an embodiment, the third frequency range is within the second frequency range. In an embodiment, the plurality of up-converted signals is provided by converting the plurality of intermediate interfering signals all within the target frequency range up to the third frequency range based on the first optical frequency comb and the second optical frequency comb. In an embodiment, the providing the plurality of up-converted signals by converting the plurality of intermediate interfering signals all within the target frequency range up to the third frequency range includes providing a first modulated signal by modulating one of the plurality of the intermediate interfering signals on a first side of a corresponding optical frequency carrier of the first optical frequency comb with the corresponding optical frequency carrier of the first optical frequency comb suppressed, and providing an up-converted signal of the plurality of up-converted signals to an RF combiner upon receipt of an optical frequency carrier of the second optical frequency comb and the first modulated signal.

At step 2050, an interfering RF output signal is provided by combining the plurality of up-converted signals, wherein the interfering RF output signal spans the third frequency range. In an embodiment, the first frequency range is the third frequency range when each of the plurality of intermediate interfering signals spans a same frequency range as the target frequency range. In an embodiment, the first frequency range is not the third frequency range when each of the plurality of intermediate interfering signals does not span a same frequency range as the target frequency range.

In an embodiment, the converting each of the plurality of frequency bands of the RF input signal down to the target frequency range upon receipt of the RF input signal, at step 2020, includes performing a suppressed-carrier single sideband modulation by modulating the RF input signal on a second side of each optical frequency carrier of the second optical frequency comb with all optical frequency carriers of the second optical frequency comb suppressed, the second side being the same as the first side. In an embodiment, the first side and the second side are both the left side. In an embodiment, the first side and the second side are both the right side.

Figure 21:
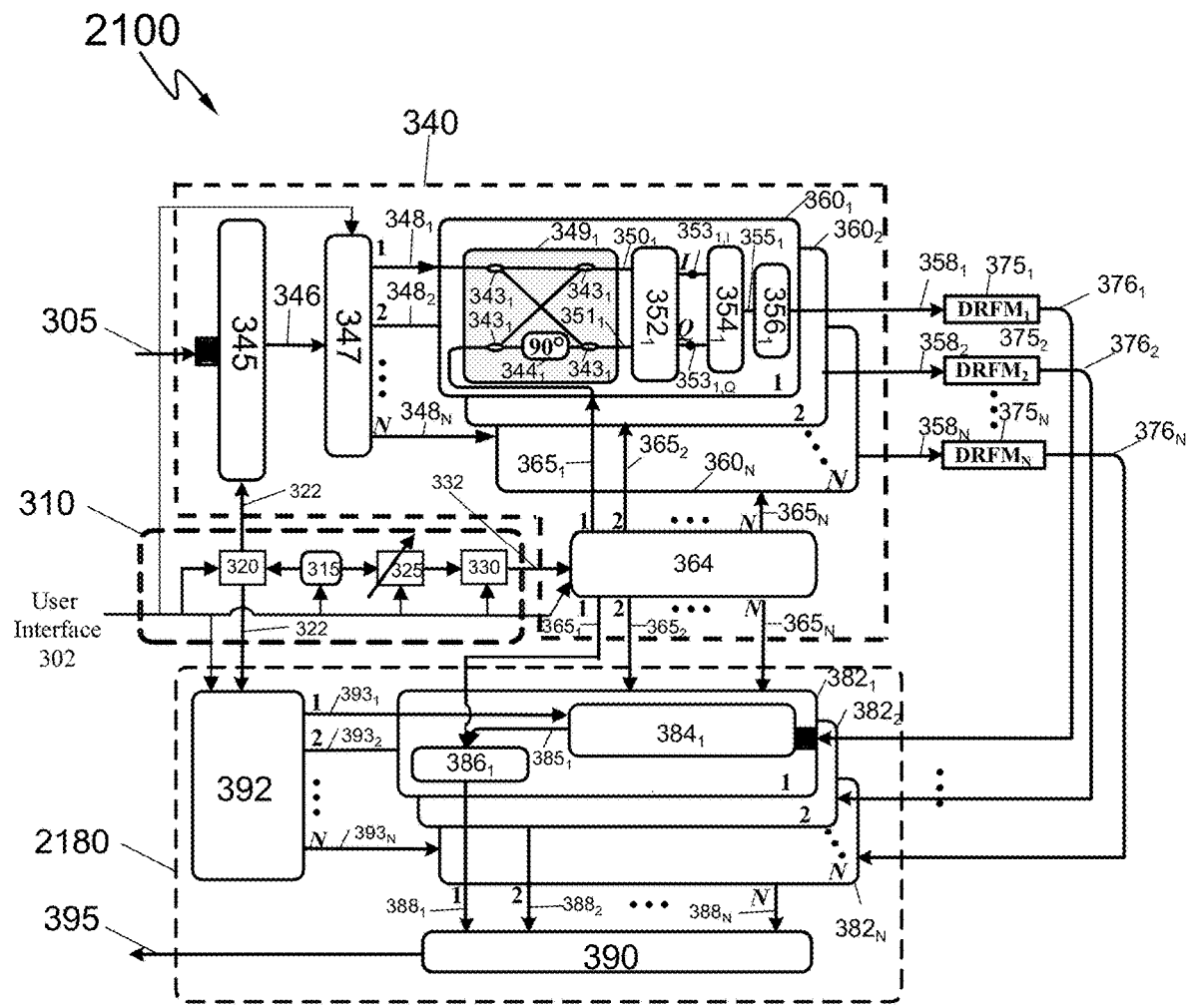
FIG. 21 is a schematic diagram of an RF signal processor according to an embodiment of the disclosure.

Referring to FIG. 21, a schematic diagram of an RF signal processor 2100 is depicted according to an embodiment of the disclosure. In an embodiment, the RF signal processor 2100 is the RF signal processor 280. As shown, the RF signal processor 2100 receives an RF input signal 305 and outputs an interfering RF output signal 395. In an embodiment, the RF input signal 305 is the RF input signal 130, and the interfering RF output signal 395 is the interfering RF output signal 260 in FIG. 2.

As shown, the RF signal processor 2100 includes the dual-comb generator 310, the signal modulator 340, the plurality of DRFMs $375_{1-N}$, which are also included in the RF signal processor 300. In addition, the RF signal processor 2100 includes an interfering signal generator 2180. The interfering signal generator 2180 includes the demultiplexer 392, the plurality of up-converters $382_{1-N}$, and the RF combiner 390, which are all included in the interfering signal generator 380 as shown in FIG. 3. However, the various components of the interfering signal generator 2180 in FIG. 21 are coupled with each other and operated differently than those of the interfering signal generator 380 in FIG. 3 as described below.

The demultiplexer 392 is coupled to the dual-comb generator 310 and the user interface 302. The demultiplexer 392 is configured to receive the first optical frequency comb 322 from the dual-comb generator 310, split the first optical frequency comb 322 to a plurality of optical frequency carriers $393_{1-N}$ individually, and provide each optical frequency carrier $393_{1-N}$ to a respective one of the plurality of up-converters $382_{1-N}$. Rather than the photodetector $386_{1-N}$, the demultiplexer 392 provides the plurality of optical frequency carriers $393_{1-N}$ to the SC-SSB modulator $384_{1-N}$. In an embodiment, a number of output channels of the demultiplexer 392 and respective frequency ranges of the output channels of the demultiplexer 392 may be reconfigurable upon request from the user interface 302. In addition, the second demultiplexer 364 provides the plurality of optical frequency carriers $365_{1-N}$ of the second optical frequency comb 332 to the photodetectors $386_{1-N}$, rather than the SC-SSB modulators $384_{1-N}$.

Each of the plurality of up-converters $382_{1-N}$, denoted by an up-converter $382_i$ for simplicity of explanation where $1 \le i \le N$ is further configured to provide a respective one of the plurality of up-converted signals $388_{1-N}$, denoted by an up-converted signal $388_i$, based on the respective one of the plurality of intermediate interfering signals modulated signals $376_{1-N}$, denoted by an intermediate interfering signal $376_i$ the respective one of the plurality of optical frequency carriers $393_{1-N}$ of the first optical frequency comb 322, denoted by an optical frequency carrier $393_i$ of the first optical frequency comb 322, and the respective one of the plurality of optical frequency carriers $365_{1-N}$ of the second optical frequency comb 332, denoted by an optical frequency carrier $365_i$ of the second optical frequency comb 332.

The up-converter $382_i$ includes the SC-SSB modulator $384_i$ and the photodetector $386_i$. The SC-SSB modulator $384_i$ is configured to perform an SC-SSB modulation upon receipt of the optical frequency carrier $393_i$ and the intermediate interfering signal $376_i$. The SC-SSB modulation allows the SC-SSB modulator $384_i$ to provide a modulated signal $385_i$ by modulating the intermediate interfering signal $376_i$ on a second side of the optical frequency carrier $393_i$ with the optical frequency carriers $393_i$ suppressed. The second side is different than the first side which was described above with regard to the SC-SSB modulator 345. This means, when the SC-SSB modulator 345 provides the modulated signal 346 by modulating the RF input signal 305 on the left side of each optical frequency carrier of the first optical frequency comb 322 with all optical frequency carriers of the first optical frequency comb 322 suppressed, the SC-SSB modulator $384_i$ provides the modulated signal $385_i$ by modulating the intermediate interfering signal $376_i$ on the right side of the optical frequency carrier $393_i$ with the optical frequency carrier $393_i$ suppressed. Alternatively, when the SC-SSB modulator 345 provides the modulated signal 346 by modulating the RF input signal 305 on the right side of each optical frequency carrier of the first optical frequency comb 322 with all optical frequency carriers of the first optical frequency comb 322 suppressed, the SC-SSB modulator $384_i$ provides the modulated signal $385_i$ by modulating the intermediate interfering signal $376_i$ on the left side of the optical frequency carrier $393_i$ with the optical frequency carrier $393_i$ suppressed.

The photodetector $386_i$ is coupled to the second demultiplexer 364 and configured to receive the optical frequency carrier $365_i$ of the second optical frequency comb 332. The photodetector $386_i$ is coupled to the SC-SSB modulator $384_i$ and is configured to receive the modulated signal $385_i$. The photodetector $386_i$ is further coupled to an input channel of the RF combiner 390 and is configured to generate the up-converted signal $388_i$ by performing a frequency beating of the optical frequency carrier $365_i$ of the second optical frequency comb 332 and the modulated signal $385_i$ and provide the up-converted signal $388_i$ to the RF combiner 390 through the respective input channel of the RF combiner 390. The RF combiner 390 further provides the interfering RF output signal 395 by combining the plurality of up-converted signals $388_{1-N}$.

Figure 22:
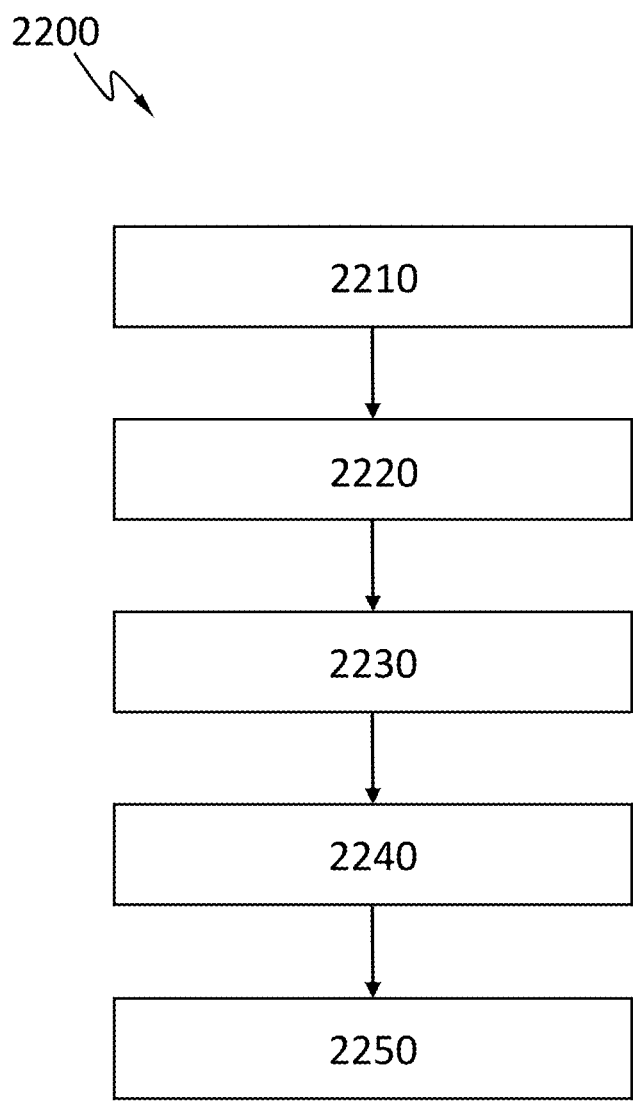
FIG. 22 is a flowchart of an exemplary process for providing an interfering RF output signal based on an RF input signal according to an embodiment of the disclosure.

Referring to FIG. 22, a flowchart 2200 of an exemplary process for providing an interfering RF output signal based on an RF input signal is shown according to an embodiment of the disclosure. In an embodiment, the exemplary process as shown in the flowchart 2200 may be performed by the RF signal processor 2100.

At step 2210, an RF input signal is received. In an embodiment, the RF input signal includes a plurality of frequency bands. In an embodiment, the RF input signal spans a first frequency range within a second frequency range. In an embodiment, the plurality of frequency bands included in the RF input signal collectively corresponds to the first frequency range. In an embodiment, the second frequency range corresponds to without limitation L band, S band, C band, X band, Ku band, K band, Ka band, U band, E band, and/or F band.

At step 2220, a plurality of down-converted signals is provided by converting each of the plurality of frequency bands of the RF input signal down to a target frequency range upon receipt of the RF input signal. In an embodiment, each frequency in the target frequency range is less than each frequency in the second frequency range. In an embodiment, the plurality of down-converted signals is provided based on a first optical frequency comb and a second optical frequency comb. In an embodiment, the first optical frequency comb and the second optical frequency comb are provided based on a continuous wave laser diode, each of the first optical frequency comb and the second optical frequency comb having a plurality of equally spaced optical frequency carriers. In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb. In an embodiment, the first optical frequency comb is the first optical frequency comb 322. In an embodiment, the second optical frequency comb is the second optical frequency comb 332.

At step 2230, a plurality of intermediate interfering signals is provided by modulating at least one of the plurality of down-converted signals. In an embodiment, the plurality of intermediate interfering signals is provided by introducing one or more time delay with respect to the at least one of the plurality of down-converted signals. Alternatively or in addition, the plurality of intermediate interfering signals is provided by performing frequency modulation on the at least one of the plurality of down-converted signals. Alternatively or in addition, the plurality of intermediate interfering signals is provided by performing amplitude modulation on the at least one of the plurality of down-converted signals.

At step 2240, a plurality of up-converted signals is provided by converting the plurality of intermediate interfering signals all within the target frequency range collectively up to a third frequency range. In an embodiment, the third frequency range is within the second frequency range. In an embodiment, the plurality of up-converted signals is provided by converting the plurality of intermediate interfering signals all within the target frequency range up to the third frequency range based on the first optical frequency comb and the second optical frequency comb. In an embodiment, the providing the plurality of up-converted signals by converting the plurality of intermediate interfering signals all within the target frequency range up to the third frequency range includes providing a first modulated signal by modulating one of the plurality of the intermediate interfering signals on a first side of a corresponding optical frequency carrier of the first optical frequency comb with the corresponding optical frequency carrier of the first optical frequency comb suppressed, and providing an up-converted signal of the plurality of up-converted signals to an RF combiner upon receipt of an optical frequency carrier of the second optical frequency comb and the first modulated signal.

At step 2250, an interfering RF output signal is provided by combining the plurality of up-converted signals, wherein the interfering RF output signal spans the third frequency range. In an embodiment, the first frequency range is the third frequency range when each of the plurality of intermediate interfering signals spans a same frequency range as the target frequency range. In an embodiment, the first frequency range is not the third frequency range when each of the plurality of intermediate interfering signals does not span a same frequency range as the target frequency range.

In an embodiment, the converting each of the plurality of frequency bands of the RF input signal down to the target frequency range upon receipt of the RF input signal, at step 2220, includes performing a suppressed-carrier single sideband modulation by modulating the RF input signal on a second side of each optical frequency carrier of the first optical frequency comb with all optical frequency carriers of the first optical frequency comb suppressed, the second side being different than the first side. In an embodiment, the first side is the left side and the second side is the right side. In an embodiment, the first side is the right side and the second side is the left side.

Figure 23:
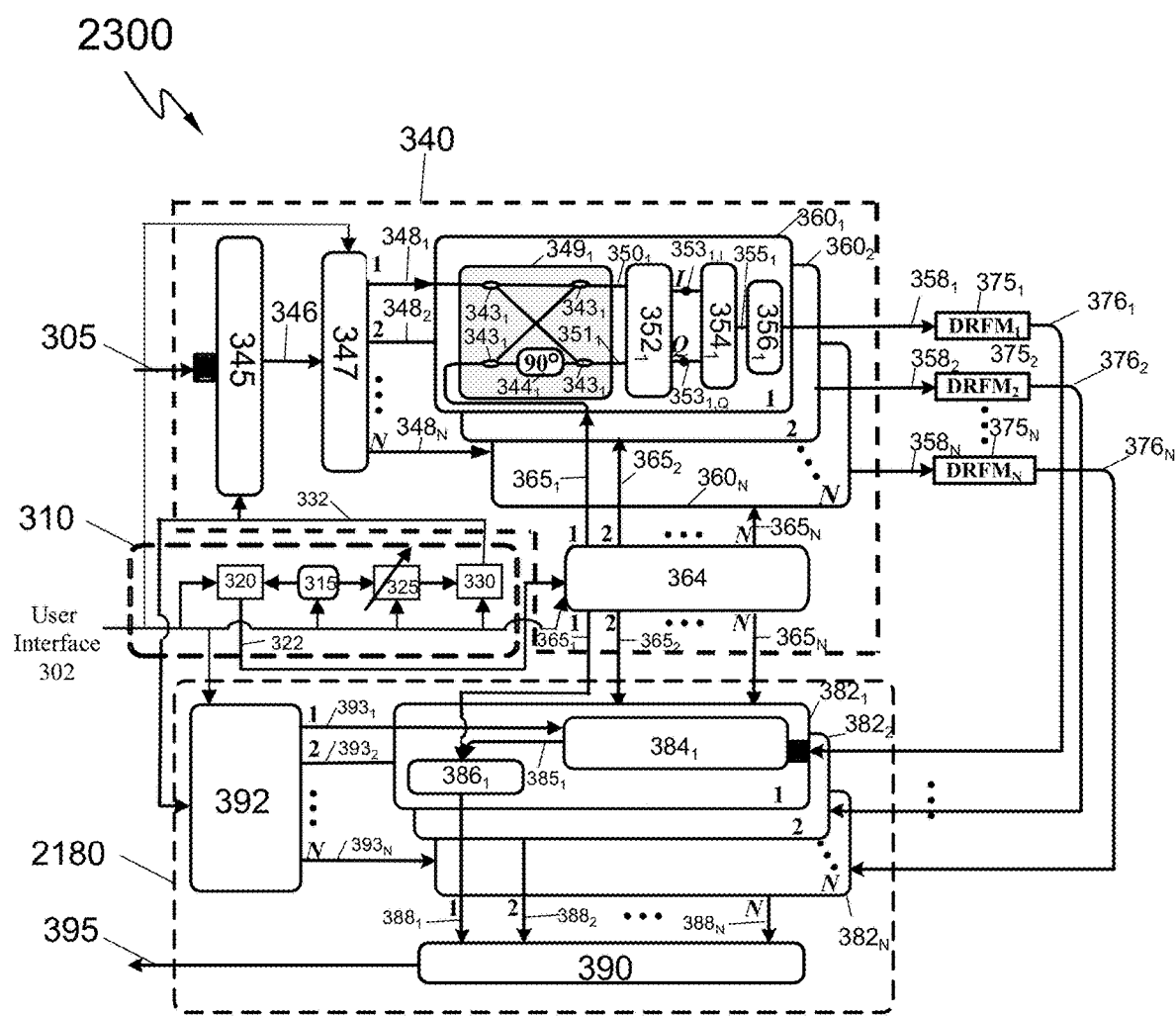
FIG. 23 is a schematic diagram of an RF signal processor according to an embodiment of the disclosure.

Referring to FIG. 23, a schematic diagram of an RF signal processor 2300 is depicted according to an embodiment of the disclosure. In an embodiment, the RF signal processor 2300 is the RF signal processor 280. As shown, the RF signal processor 2300 receives an RF input signal 305 and outputs an interfering RF output signal 395. In an embodiment, the RF input signal 305 is the RF input signal 130, and the interfering RF output signal 395 is the interfering RF output signal 260 in FIG. 2.

As shown, the RF signal processor 2300 includes the dual-comb generator 310, the signal modulator 340, the plurality of DRFMs $375_{1-N}$, which are also included in the RF signal processor 1900 and operated similarly as the counterparts in the RF signal processor 1900. In addition, the RF signal processor 2300 includes the interfering signal generator 2180 in FIG. 21. However, the various components of the interfering signal generator 2180 in FIG. 23 operate differently than those of the interfering signal generator 2180 in FIG. 21 as described below.

The demultiplexer 392 is coupled to the dual-comb generator 310 and the user interface 302. The demultiplexer 392 is configured to receive the second optical frequency comb 332 from the dual-comb generator 310, split the second optical frequency comb 332 to a plurality of optical frequency carriers $393_{1-N}$ individually, and provide each optical frequency carrier $393_{1-N}$ to a respective one of the plurality of up-converters $382_{1-N}$. The demultiplexer 392 provides the plurality of optical frequency carriers $393_{1-N}$ to the SC-SSB modulator $384_{1-N}$. In an embodiment, a number of output channels of the demultiplexer 392 and respective frequency ranges of the output channels of the demultiplexer 392 may be reconfigurable upon request from the user interface 302. In addition, the second demultiplexer 364 provides the plurality of optical frequency carriers $365_{1-N}$ of the first optical frequency comb 322 to the photodetectors $386_{1-N}$.

Each of the plurality of up-converters $382_{1-N}$, denoted by an up-converter $382_i$ for simplicity of explanation where $1 \leq i \leq N$ is further configured to provide a respective one of the plurality of up-converted signals $388_{1-N}$, denoted by an up-converted signal $388_i$, based on the respective one of the plurality of intermediate interfering signals $376_{1-N}$, denoted by an intermediate interfering signal $376_i$, the respective one of the plurality of optical frequency carriers $393_{1-N}$ of the second optical frequency comb 332, denoted by an optical frequency carrier $393_i$ of the second optical frequency comb 332, and the respective one of the plurality of optical frequency carriers $365_{1-N}$ of the first optical frequency comb 322, denoted by an optical frequency carrier $365_i$ of the first optical frequency comb 322.

The up-converter $382_i$ includes the SC-SSB modulator $384_i$ and the photodetector $386_i$. The SC-SSB modulator $384_i$ is configured to perform an SC-SSB modulation upon receipt of the optical frequency carrier $393_i$ and the intermediate interfering signal $376_i$. The SC-SSB modulation allows the SC-SSB modulator $384_i$ to provide a modulated signal $385_i$ by modulating the intermediate interfering signal $376_i$ on a second side of the optical frequency carrier $393_i$ with the optical frequency carriers $393_i$ suppressed. The second side is different than the first side which was described above with regard to the SC-SSB modulator 345. This means, when the SC-SSB modulator 345 provides the modulated signal 346 by modulating the RF input signal 305 on the left side of each optical frequency carrier of the second optical frequency comb 332 with all optical frequency carriers of the second optical frequency comb 332 suppressed, the SC-SSB modulator $384_i$ provides the modulated signal $385_i$ by modulating the intermediate interfering signal $376_i$ on the right side of the optical frequency carrier $393_i$ with the optical frequency carrier $393_i$ suppressed. Alternatively, when the SC-SSB modulator 345 provides the modulated signal 346 by modulating the RF input signal 305 on the right side of each optical frequency carrier of the second optical frequency comb 332 with all optical frequency carriers of the second optical frequency comb 332 suppressed, the SC-SSB modulator $384_i$ provides the modulated signal $385_i$ by modulating the intermediate interfering signal $3'76_i$ on the left side of the optical frequency carrier $393_i$ with the optical frequency carrier $393_i$ suppressed.

The photodetector $386_i$ is coupled to the second demultiplexer 364 and configured to receive the optical frequency carrier $365_i$ of the first optical frequency comb 322. The photodetector $386_i$ is coupled to the SC-SSB modulator $384_i$ and is configured to receive the modulated signal $385_i$. The photodetector $386_i$ is further coupled to an input channel of the RF combiner 390 and is configured to generate the up-converted signal $388_i$ by performing a frequency beating of the optical frequency carrier $365_i$ of the first optical frequency comb 322 and the modulated signal $385_i$ and provide the up-converted signal $388_i$ to the RF combiner 390 through the respective input channel of the RF combiner 390. The RF combiner 390 further provides the interfering RF output signal 395 by combining the plurality of up-converted signals $388_{1-N}$.

Figure 24:
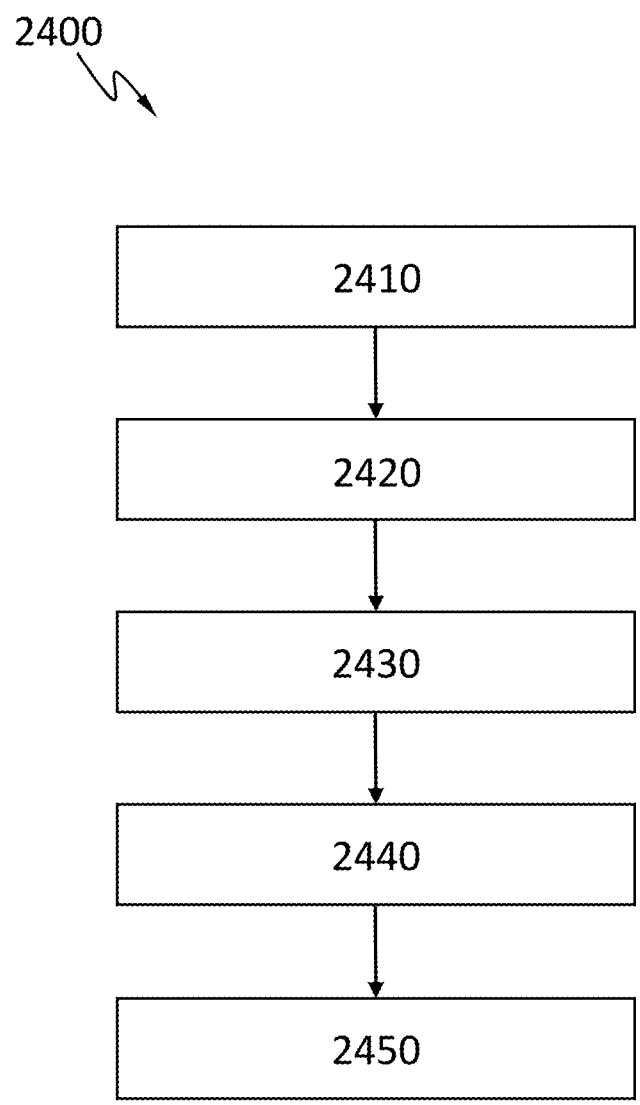
FIG. 24 is a flowchart of an exemplary process for providing an interfering RF output signal based on an RF input signal according to an embodiment of the disclosure.

Referring to FIG. 24, a flowchart 2400 of an exemplary process for providing an interfering RF output signal based on an RF input signal is shown according to an embodiment of the disclosure. In an embodiment, the exemplary process as shown in the flowchart 2400 may be performed by the RF signal processor 2300.

At step 2410, an RF input signal is received. In an embodiment, the RF input signal includes a plurality of frequency bands. In an embodiment, the RF input signal spans a first frequency range within a second frequency range. In an embodiment, the plurality of frequency bands included in the RF input signal collectively corresponds to the first frequency range. In an embodiment, the second frequency range corresponds to without limitation L band, S band, C band, X band, Ku band, K band, Ka band, U band, E band, and/or F band.

At step 2420, a plurality of down-converted signals is provided by converting each of the plurality of frequency bands of the RF input signal down to a target frequency range upon receipt of the RF input signal. In an embodiment, each frequency in the target frequency range is less than each frequency in the second frequency range. In an embodiment, the plurality of down-converted signals is provided based on a first optical frequency comb and a second optical frequency comb. In an embodiment, the first optical frequency comb and the second optical frequency comb are provided based on a continuous wave laser diode, each of the first optical frequency comb and the second optical frequency comb having a plurality of equally spaced optical frequency carriers. In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb. In an embodiment, the first optical frequency comb is the first optical frequency comb 322. In an embodiment, the second optical frequency comb is the second optical frequency comb 332.

At step 2430, a plurality of intermediate interfering signals is provided by modulating at least one of the plurality of down-converted signals. In an embodiment, the plurality of intermediate interfering signals is provided by introducing one or more time delay with respect to the at least one of the plurality of down-converted signals. Alternatively or in addition, the plurality of intermediate interfering signals is provided by performing frequency modulation on the at least one of the plurality of down-converted signals. Alternatively or in addition, the plurality of intermediate interfering signals is provided by performing amplitude modulation on the at least one of the plurality of down-converted signals.

At step 2440, a plurality of up-converted signals is provided by converting the plurality of intermediate interfering signals all within the target frequency range collectively up to a third frequency range. In an embodiment, the third frequency range is within the second frequency range. In an embodiment, the plurality of up-converted signals is provided by converting the plurality of intermediate interfering signals all within the target frequency range up to the third frequency range based on the first optical frequency comb and the second optical frequency comb. In an embodiment, the providing the plurality of up-converted signals by converting the plurality of intermediate interfering signals all within the target frequency range up to the third frequency range includes providing a first modulated signal by modulating one of the plurality of the intermediate interfering signals on a first side of a corresponding optical frequency carrier of the second optical frequency comb with the corresponding optical frequency carrier of the second optical frequency comb suppressed, and providing an up-converted signal of the plurality of up-converted signals to an RF combiner upon receipt of an optical frequency carrier of the first optical frequency comb and the first modulated signal.

At step 2450, an interfering RF output signal is provided by combining the plurality of up-converted signals, wherein the interfering RF output signal spans the third frequency range. In an embodiment, the first frequency range is the third frequency range when each of the plurality of intermediate interfering signals spans a same frequency range as the target frequency range. In an embodiment, the first frequency range is not the third frequency range when each of the plurality of intermediate interfering signals does not span a same frequency range as the target frequency range.

In an embodiment, the converting each of the plurality of frequency bands of the RF input signal down to the target frequency range upon receipt of the RF input signal, at step 2420, includes performing a suppressed-carrier single sideband modulation by modulating the RF input signal on a second side of each optical frequency carrier of the second optical frequency comb with all optical frequency carriers of the second optical frequency comb suppressed, the second side being different than the first side. In an embodiment, the first side is the left side and the second side is the right side. In an embodiment, the first side is the right side and the second side is the left side.

There is provided an apparatus comprising: a signal modulator configured to: receive an RF input signal having a plurality of frequency bands and spanning a first frequency range, wherein the first frequency range is within a second frequency range; and provide a plurality of down-converted signals by converting each of the plurality of frequency bands of the RF input signal down to a target frequency range upon receipt of the RF input signal, wherein each frequency in the target frequency range is less than each frequency in the second frequency range; a plurality of DRFMs coupled to the signal modulator, the plurality of DRFMs configured to provide a plurality of intermediate interfering signals by modulating at least one of the plurality of down-converted signals; and an interfering signal generator coupled to the plurality of DRFMs, the interfering signal generator configured to: provide a plurality of up-converted signals by converting the plurality of intermediate interfering signals all within the target frequency range collectively up to a third frequency range, wherein the third frequency range is within the second frequency range; and provide an interfering RF output signal by combining the plurality of up-converted signals, wherein the interfering RF output signal spans the third frequency range.

In an embodiment, the first frequency range is the third frequency range when each of the plurality of intermediate interfering signals spans a same frequency range as the target frequency range.

In an embodiment, the apparatus further includes a dual-comb generator coupled to the signal modulator and the interfering signal generator, the dual-comb generator comprising a continuous wave laser diode, the dual-comb generator configured to provide a first optical frequency comb and a second optical frequency comb based on the continuous wave laser diode, each of the first optical frequency comb and the second optical frequency comb having a plurality of equally spaced optical frequency carriers, wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency range based on the first optical frequency comb and the second optical frequency comb.

In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

In an embodiment, the interfering signal generator includes a first optical demultiplexer, a plurality of up-converters coupled to the first demultiplexer, and an RF combiner coupled to the plurality of up-converters, wherein the first optical demultiplexer is configured to provide each optical frequency carrier of the first optical frequency comb to a corresponding one of the plurality of up-converters.

In an embodiment, each of the plurality of up-converters includes a first suppressed-carrier single sideband modulator configured to provide a first modulated signal by modulating one of the plurality of the intermediate interfering signals on a first side of a corresponding optical frequency carrier of the second optical frequency comb with the corresponding optical frequency carrier of the second optical frequency comb suppressed.

In an embodiment, each of the plurality of up-converters further includes a photodetector coupled to the first suppressed-carrier single sideband modulator, and wherein the photodetector is configured to provide an up-converted signal of the plurality of up-converted signals to the RF combiner upon receipt of an optical frequency carrier of the first optical frequency comb and the first modulated signal.

In an embodiment, the signal modulator includes a second suppressed-carrier single sideband modulator, and wherein the second suppressed-carrier single sideband modulator is configured to: perform a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed, wherein the second side is same as the first side when the one of the first optical frequency comb and the second optical frequency comb is the first optical frequency comb, and wherein the second side is different than the first side when the one of the first optical frequency comb and the second optical frequency comb is the second optical frequency comb.

In an embodiment, there is provided a method comprising: receiving an RF input signal having a plurality of frequency bands and spanning a first frequency range, wherein the first frequency range is within a second frequency range; providing a plurality of down-converted signals by converting each of the plurality of frequency bands of the RF input signal down to a target frequency range upon receipt of the RF input signal, wherein each frequency in the target frequency range is less than each frequency in the second frequency range; providing a plurality of intermediate interfering signals by modulating at least one of the plurality of down-converted signals; providing a plurality of up-converted signals by converting the plurality of intermediate interfering signals all within the target frequency range collectively up to a third frequency range, wherein the third frequency range is within the second frequency range; and providing an interfering RF output signal by combining the plurality of up-converted signals, wherein the interfering RF output signal spans the third frequency range.

In an embodiment, the first frequency range is the third frequency range when each of the plurality of intermediate interfering signals spans a same frequency range as the target frequency range.

In an embodiment, the method further includes providing a first optical frequency comb and a second optical frequency comb based on a continuous wave laser diode, each of the first optical frequency comb and the second optical frequency comb having a plurality of equally spaced optical frequency carriers, wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency ranges based on the first optical frequency comb and the second optical frequency comb.

In an embodiment, a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

In an embodiment, the providing the plurality of up-converted signals by converting the plurality of intermediate interfering signals all within the target frequency range up to the third frequency ranges further includes providing a first modulated signal by modulating one of the plurality of the intermediate interfering signals on a first side of a corresponding optical frequency carrier of the second optical frequency comb with the corresponding optical frequency carrier of the second optical frequency comb suppressed.

In an embodiment, the providing the plurality of down-converted signals by converting each of the plurality of frequency bands of the RF input signal down to the target frequency range upon receipt of the RF input signal further includes: performing a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed.

In an embodiment, the second side is same as the first side when the one of the first optical frequency comb and the second optical frequency comb is the first optical frequency comb, and wherein the second side is different than the first side when the one of the first optical frequency comb and the second optical frequency comb is the second optical frequency comb.

In an embodiment, there is provided a machine-readable tangible and non-transitory medium having information, wherein the information, when read by a hardware processor system, causes the hardware processor system to perform following: receiving an RF input signal having a plurality of frequency bands and spanning a first frequency range, wherein the first frequency range is within a second frequency range; providing a plurality of down-converted signals by converting each of the plurality of frequency bands of the RF input signal down to a target frequency range upon receipt of the RF input signal, wherein each frequency in the target frequency range is less than each frequency in the second frequency range; providing a plurality of intermediate interfering signals by modulating at least one of the plurality of down-converted signals; providing a plurality of up-converted signals by converting the plurality of intermediate interfering signals all within the target frequency range collectively up to a third frequency range, wherein the third frequency range is within the second frequency range; and providing an interfering RF output signal by combining the plurality of up-converted signals, wherein the interfering RF output signal spans the third frequency range.

In an embodiment, the first frequency range is the third frequency range when each of the plurality of intermediate interfering signals spans a same frequency range as the target frequency range.

In an embodiment, the information, when read by the hardware processor system, further causes the hardware processor system to perform following: providing a first optical frequency comb and a second optical frequency comb based on a continuous wave laser diode, each of the first optical frequency comb and the second optical frequency comb having a plurality of equally spaced optical frequency carriers, wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency ranges based on the first optical frequency comb and the second optical frequency comb, and wherein a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

In an embodiment, the providing the plurality of up-converted signals by converting the plurality of intermediate interfering signals all within the target frequency range up to the third frequency ranges further includes providing a first modulated signal by modulating one of the plurality of the intermediate interfering signals on a first side of a corresponding optical frequency carrier of the second optical frequency comb with the corresponding optical frequency carrier of the second optical frequency comb suppressed.

In an embodiment, the providing the plurality of down-converted signals by converting each of the plurality of frequency bands of the RF input signal down to the target frequency range upon receipt of the RF input signal further includes: performing a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed, wherein the second side is same as the first side when the one of the first optical frequency comb and the second optical frequency comb is the first optical frequency comb, and wherein the second side is different than the first side when the one of the first optical frequency comb and the second optical frequency comb is the second optical frequency comb.

Figure 25:
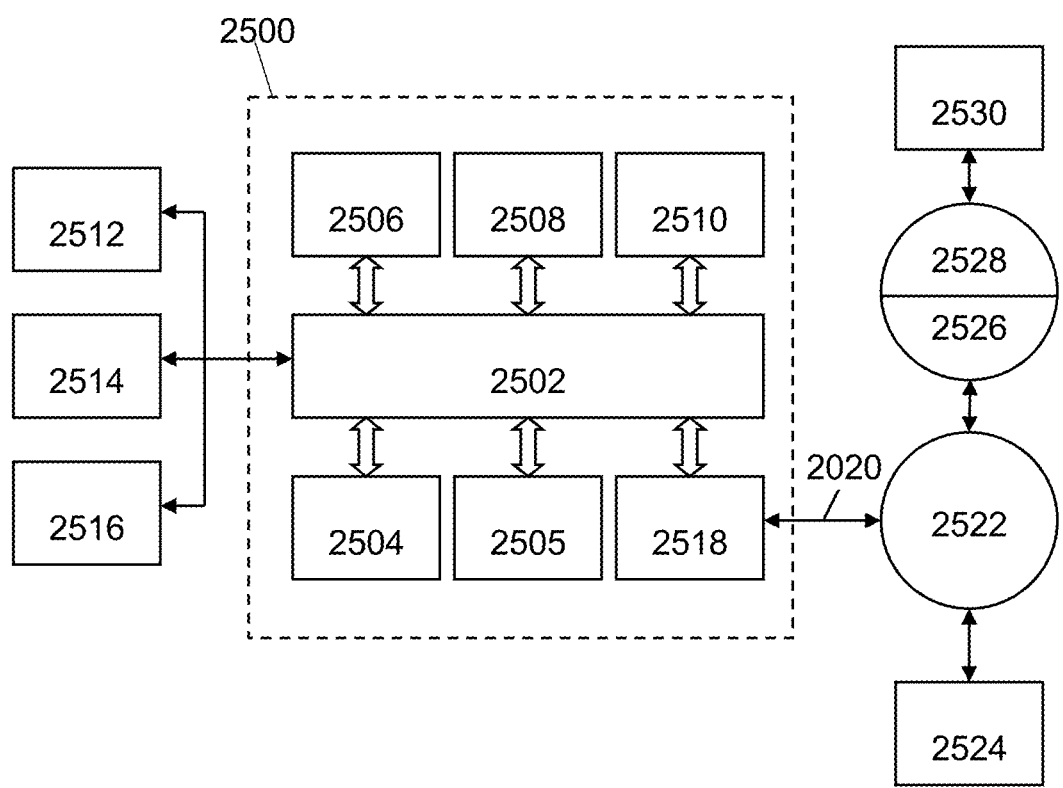
FIG. 25 depicts a general computer architecture on which the present disclosure can be implemented.

Referring to FIG. 25, a computer system 25 is shown. The computer system 2500 includes a bus 2502 or other communication mechanism to communicate information, and a processor 2504 (or multiple processors 2504 and 2505) coupled with the bus 2502 to process information. In an embodiment, the computer system 2500 includes a main memory 2506, such as a random access memory (RAM) or other dynamic storage device, coupled to the bus 2502 to store information and instructions to be executed by the processor 2504. The main memory 2506 may be used to store temporary variables or other intermediate information during execution of instructions to be executed by the processor 2504. In an embodiment, the computer system 2500 includes a read only memory (ROM) 2508 or other static storage device coupled to the bus 2502 to store essentially static information and instructions for the processor 2504. In an embodiment, a storage device 2510, such as a solid state drive, magnetic disk or optical disk, is provided and coupled to the bus 2502 to store information and instructions.

The computer system 2500 may be coupled via the bus 2502 to a display 2512, such as a cathode ray tube (CRT) or flat panel or touch panel display, to display information to a computer user. In an embodiment, an input device 2514, including or providing alphanumeric and other keys, is coupled to the bus 2502 to communicate information and command selections to the processor 2504. Another type of user input device is a cursor controller 2516, such as a mouse, a trackball, or cursor direction keys, to communicate direction information and command selections to the processor 2504 and to control cursor movement on the display 2512. A touch panel (screen) display may also be used as an input device.

The computer system 2500 may be suitable to implement methods as described herein in response to the processor 2504 executing one or more sequences of one or more instructions contained in, e.g., the main memory 2506. Such instructions may be read into the main memory 2506 from another computer-readable medium, such as the storage device 2510. In an embodiment, execution of sequences of instructions contained in the main memory 2506 causes the processor 2504 to perform process steps described herein. One or more processors in a multi-processing arrangement may be employed to execute the sequences of instructions contained in the main memory 2506. In an embodiment, a hard-wired circuitry may be used in place of or in combination with software instructions. Thus, embodiments are not limited to any specific combination of hardware circuitry and software.

The term "computer-readable medium" as used herein refers to any medium that participates in providing instructions to the processor 2504 for execution. Such a medium may take many forms, including but not limited to, non-volatile media, volatile media, and transmission media. Non-volatile media include, for example, solid state, optical or magnetic disks, such as the storage device 2510. Volatile media include dynamic memory, such as the main memory 2506. Non-volatile and volatile media are considered non-transitory. Non-transitory transmission media include coaxial cables, copper wire and fiber optics, including the wires that include the bus 2502. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tapes, any other physical medium with patterns of holes, an RAM, a PROM, and EPROM, a FLASH-EPROM, a solid-state disk or any other memory chip or cartridge, a carrier wave as described herein, or any other medium from which a computer can read.

Various forms of computer readable media may be involved in carrying one or more sequences of one or more instructions to the processor 2504 for execution. For example, the instructions may initially be borne on a magnetic disk of a remote computer. The remote computer can load the instructions into its dynamic memory and send the instructions over communications medium (e.g., by line or wireless). The computer system 2500 can receive the transmitted data and place the data on the bus 2502. The bus 2502 carries the data to the main memory 2506, from which the processor 2504 retrieves and executes the instructions. The instructions received by the main memory 2506 may optionally be stored on the storage device 2510 either before or after execution by the processor 2504.

The computer system 2500 may also include a communication interface 2518 coupled to the bus 2502. The communication interface 2518 provides a two-way data communication coupling to a network link 2520 that is connected to a local network 2522. For example, the communication interface 2518 may be an integrated service digital network (ISDN) card or a modem to provide a data communication connection to a corresponding type of line. As another example, the communication interface 2518 may be a local area network (LAN) card to provide a data communication connection to a compatible LAN. Wireless links may also be implemented. In any such implementation, the communication interface 2518 sends and receives electrical, electromagnetic or optical signals that carry digital data streams representing various types of information.

The network link 2520 typically provides data communication through one or more networks to other data devices. For example, the network link 2520 may provide a connection through the local network 2522 to a host computer 2524 or to data equipment operated by an Internet Service Provider (ISP) 2526. The ISP 2526 in turn provides data communication services through the worldwide packet data communication network, commonly referred to as the internet 2528. The local network 2522 and the internet 2528 both use electrical, electromagnetic or optical signals that carry digital data streams. The signals through the various networks and the signals on the network link 2520 and through the communication interface 2518, which carry the digital data to and from the computer system 2500, are exemplary forms of carrier waves transporting the information.

The computer system 2500 can send messages and receive data, including program code, through the network (s), the network link 2520, and the communication interface 2518. In the internet example, a server 2530 might transmit a requested code for an application program through the internet 2528, the ISP 2526, the local network 2522 and the communication interface 2518. In accordance with one or more embodiments, one such downloaded application implements a method as described herein. The received code may be executed by the processor 2504 as it is received, and/or stored in the storage device 2510, or other non-volatile storage for later execution. In this manner, the computer system 2500 may obtain application code.

An embodiment may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. An apparatus comprising:
a signal modulator configured to:
receive a radio frequency (RF) input signal having a plurality of frequency bands and spanning a first frequency range, wherein the first frequency range is within a second frequency range; and
provide a plurality of down-converted signals by converting each of the plurality of frequency bands of the RF input signal down to a target frequency range upon receipt of the RF input signal, wherein each frequency in the target frequency range is less than each frequency in the second frequency range;
a plurality of digital RF memories (DRFMs) coupled to the signal modulator, the plurality of DRFMs configured to provide a plurality of intermediate interfering signals by modulating at least one of the plurality of down-converted signals; and
an interfering signal generator coupled to the plurality of DRFMs, the interfering signal generator configured to:
provide a plurality of up-converted signals by converting the plurality of intermediate interfering signals all within the target frequency range collectively up to a third frequency range, wherein the third frequency range is within the second frequency range; and
provide an interfering RF output signal by combining the plurality of up-converted signals, wherein the interfering RF output signal spans the third frequency range.

2. The apparatus of claim 1, wherein the first frequency range is the third frequency range when each of the plurality of intermediate interfering signals spans a same frequency range as the target frequency range.

3. The apparatus of claim 2, further comprising a dual-comb generator coupled to the signal modulator and the interfering signal generator, the dual-comb generator comprising a continuous wave laser diode, the dual-comb generator configured to provide a first optical frequency comb and a second optical frequency comb based on the continuous wave laser diode, each of the first optical frequency comb and the second optical frequency comb having a plurality of equally spaced optical frequency carriers, wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency range based on the first optical frequency comb and the second optical frequency comb.

4. The apparatus of claim 3, wherein a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

5. The apparatus of claim 4, wherein the interfering signal generator comprises a first optical demultiplexer, a plurality of up-converters coupled to the first demultiplexer, and an RF combiner coupled to the plurality of up-converters, wherein the first optical demultiplexer is configured to provide each optical frequency carrier of the first optical frequency comb to a corresponding one of the plurality of up-converters.

6. The apparatus of claim 5, wherein each of the plurality of up-converters comprises a first suppressed-carrier single sideband modulator configured to provide a first modulated signal by modulating one of the plurality of the intermediate interfering signals on a first side of a corresponding optical frequency carrier of the second optical frequency comb with the corresponding optical frequency carrier of the second optical frequency comb suppressed.

7. The apparatus of claim 6, wherein each of the plurality of up-converters further comprises a photodetector coupled to the first suppressed-carrier single sideband modulator, and wherein the photodetector is configured to provide an up-converted signal of the plurality of up-converted signals to the RF combiner upon receipt of an optical frequency carrier of the first optical frequency comb and the first modulated signal.

8. The apparatus of claim 7, wherein the signal modulator comprises a second suppressed-carrier single sideband modulator, and wherein the second suppressed-carrier single sideband modulator is configured to:
perform a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed,
wherein the second side is same as the first side when the one of the first optical frequency comb and the second optical frequency comb is the first optical frequency comb, and
wherein the second side is different than the first side when the one of the first optical frequency comb and the second optical frequency comb is the second optical frequency comb.

9. A method comprising:
receiving a radio frequency (RF) input signal having a plurality of frequency bands and spanning a first frequency range, wherein the first frequency range is within a second frequency range;
providing a plurality of down-converted signals by converting each of the plurality of frequency bands of the RF input signal down to a target frequency range upon receipt of the RF input signal, wherein each frequency in the target frequency range is less than each frequency in the second frequency range;
providing a plurality of intermediate interfering signals by modulating at least one of the plurality of down-converted signals;
providing a plurality of up-converted signals by converting the plurality of intermediate interfering signals all within the target frequency range collectively up to a third frequency range, wherein the third frequency range is within the second frequency range; and
providing an interfering RF output signal by combining the plurality of up-converted signals, wherein the interfering RF output signal spans the third frequency range.

10. The method of claim 9, wherein the first frequency range is the third frequency range when each of the plurality of intermediate interfering signals spans a same frequency range as the target frequency range.

11. The method of claim 10, further comprising providing a first optical frequency comb and a second optical frequency comb based on a continuous wave laser diode, each of the first optical frequency comb and the second optical frequency comb having a plurality of equally spaced optical frequency carriers, wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency ranges based on the first optical frequency comb and the second optical frequency comb.

12. The method of claim 11, wherein a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

13. The method of claim 12, wherein the providing the plurality of up-converted signals by converting the plurality of intermediate interfering signals all within the target frequency range up to the third frequency ranges further comprises providing a first modulated signal by modulating one of the plurality of the intermediate interfering signals on a first side of a corresponding optical frequency carrier of the second optical frequency comb with the corresponding optical frequency carrier of the second optical frequency comb suppressed.

14. The method of claim 13, wherein the providing the plurality of down-converted signals by converting each of the plurality of frequency bands of the RF input signal down to the target frequency range upon receipt of the RF input signal further comprises:
performing a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed.

15. The method of claim 14, wherein the second side is same as the first side when the one of the first optical frequency comb and the second optical frequency comb is the first optical frequency comb, and wherein the second side is different than the first side when the one of the first optical frequency comb and the second optical frequency comb is the second optical frequency comb.

16. A machine-readable tangible and non-transitory medium having information, wherein the information, when read by a hardware processor system, causes the hardware processor system to perform following:
receiving a radio frequency (RF) input signal having a plurality of frequency bands and spanning a first frequency range, wherein the first frequency range is within a second frequency range;
providing a plurality of down-converted signals by converting each of the plurality of frequency bands of the RF input signal down to a target frequency range upon receipt of the RF input signal, wherein each frequency in the target frequency range is less than each frequency in the second frequency range;
providing a plurality of intermediate interfering signals by modulating at least one of the plurality of down-converted signals;
providing a plurality of up-converted signals by converting the plurality of intermediate interfering signals all within the target frequency range collectively up to a third frequency range, wherein the third frequency range is within the second frequency range; and
providing an interfering RF output signal by combining the plurality of up-converted signals, wherein the interfering RF output signal spans the third frequency range.

17. The machine-readable tangible and non-transitory medium of claim 16, wherein the first frequency range is the third frequency range when each of the plurality of intermediate interfering signals spans a same frequency range as the target frequency range.

18. The machine-readable tangible and non-transitory medium of claim 17, wherein the information, when read by the hardware processor system, further causes the hardware processor system to perform following:
providing a first optical frequency comb and a second optical frequency comb based on a continuous wave laser diode, each of the first optical frequency comb and the second optical frequency comb having a plurality of equally spaced optical frequency carriers,
wherein the plurality of down-converted signals is provided by converting each of the plurality of frequency bands of the RF input signal down to the target frequency range based on the first optical frequency comb and the second optical frequency comb upon receipt of the RF input signal, and wherein the plurality of up-converted signals is provided by converting the plurality of intermediate interfering signals all within the target frequency range up to the third frequency ranges based on the first optical frequency comb and the second optical frequency comb, and
wherein a first spacing between adjacent optical frequency carriers of the first optical frequency comb is different than a second spacing between adjacent optical frequency carriers of the second optical frequency comb, and a center frequency of the first optical frequency comb is different than a center frequency of the second optical frequency comb.

19. The machine-readable tangible and non-transitory medium of claim 18, wherein the providing the plurality of up-converted signals by converting the plurality of intermediate interfering signals all within the target frequency range up to the third frequency ranges further comprises providing a first modulated signal by modulating one of the plurality of the intermediate interfering signals on a first side of a corresponding optical frequency carrier of the second optical frequency comb with the corresponding optical frequency carrier of the second optical frequency comb suppressed.

20. The machine-readable tangible and non-transitory medium of claim 19, wherein the providing the plurality of down-converted signals by converting each of the plurality of frequency bands of the RF input signal down to the target frequency range upon receipt of the RF input signal further comprises:
performing a suppressed-carrier single sideband modulation by modulating the RF input signal on a second side of each optical frequency carrier of one of the first optical frequency comb and the second optical frequency comb with all optical frequency carriers of the one of the first optical frequency comb and the second optical frequency comb suppressed,
wherein the second side is same as the first side when the one of the first optical frequency comb and the second optical frequency comb is the first optical frequency comb, and wherein the second side is different than the first side when the one of the first optical frequency comb and the second optical frequency comb is the second optical frequency comb.

* * * * *